US010685020B2

(12) United States Patent
Chaudhuri et al.

(10) Patent No.: US 10,685,020 B2
(45) Date of Patent: Jun. 16, 2020

(54) RE-COSTING FOR ON-LINE OPTIMIZATION OF PARAMETERIZED QUERIES WITH GUARANTEES

(71) Applicant: Microsoft Technology Licensing, LLC, Redmond, WA (US)

(72) Inventors: Surajit Chaudhuri, Redmond, WA (US); Anshuman Dutt, Redmond, WA (US); Vivek R Narasayya, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 357 days.

(21) Appl. No.: 15/612,881

(22) Filed: Jun. 2, 2017

(65) Prior Publication Data

US 2018/0329955 A1 Nov. 15, 2018

Related U.S. Application Data

(60) Provisional application No. 62/505,646, filed on May 12, 2017.

(51) Int. Cl.
*G06F 16/2453* (2019.01)
(52) U.S. Cl.
CPC .............. *G06F 16/24545* (2019.01)
(58) Field of Classification Search
CPC ........... G06F 16/24545; G06F 16/2423; G06F 16/24553
USPC ........................................................ 707/718
See application file for complete search history.

(56) References Cited

U.S. PATENT DOCUMENTS

| 6,356,887 | B1 | 3/2002 | Berenson et al. |
| 2002/0198867 | A1* | 12/2002 | Lohman ............ G06F 16/24545 707/999.003 |
| 2005/0098078 | A1* | 5/2005 | Tirpak .................... B63B 17/00 114/123 |
| 2005/0267866 | A1 | 12/2005 | Markl et al. |
| 2008/0052266 | A1 | 2/2008 | Goldstein et al. |

(Continued)

FOREIGN PATENT DOCUMENTS

WO 2017019879 A1 2/2017

OTHER PUBLICATIONS

Bruno, et al., "Configuration-Parametric Query Optimization for Physical Design Tuning", in Proceedings of the ACM SIGMOD international conference on Management of data, Jun. 9, 2008, 13 pages.

(Continued)

*Primary Examiner* — Shahid A Alam
(74) *Attorney, Agent, or Firm* — Schwegman Lundberg & Woessner, P.A.

(57) ABSTRACT

In some embodiments, the disclosed subject matter involves a server query optimizer for parametric query optimization (PQO) to address the problem of finding and reusing a relatively small number of query plans that can achieve good plan quality across multiple instances of a parameterized query. An embodiment processes query instances on-line and ensures (a) tight, bounded cost sub-optimality for each instance, (b) low optimization overheads, and (c) only a small number of plans need to be stored. A plan re-costing based approach is disclosed to provide good performance on all three metrics. Other embodiments are described and claimed.

20 Claims, 12 Drawing Sheets

(56) References Cited

U.S. PATENT DOCUMENTS

| | | |
|---|---|---|
| 2008/0172356 A1 | 7/2008 | Bruno et al. |
| 2009/0327254 A1 | 12/2009 | Bruno et al. |
| 2010/0235347 A1 | 9/2010 | Chaudhuri et al. |
| 2011/0029508 A1 | 2/2011 | Al-omari et al. |
| 2011/0035369 A1* | 2/2011 | Halasipuram ..... G06F 16/24549 707/720 |

OTHER PUBLICATIONS

Abhirama, et al., "On the Stability of Plan Costs and the Costs of Plan Stability", in Journal of the VLDB Endowment, vol. 3, No. 1, Sep. 2010, pp. 1137-1148.

Aluc, et al., "Parametric Plan Caching Using Density-Based Clustering", in Proceedings of IEEE 28th International Conference on Data Engineering, Apr. 1, 2012, 12 pages.

Babcock, et al., "Towards a Robust Query Optimizer: A Principled and Practical Approach", in Proceedings of the ACM SIGMOD international conference on Management of data, Jun. 14, 2005, pp. 119-130.

Bizarro, et al., "Progressive Parametric Query Optimization", in Proceedings of IEEE Transactions on Knowledge and Data Engineering, vol. 21, Issue 4, Apr. 2009, pp. 582-594.

Chaudhuri, et al., "Variance aware optimization of parameterized queries", in Proceedings of the ACM SIGMOD International Conference on Management of data, Jun. 6, 2010, 12 pages.

Chu, et al., "Least Expected Cost Query Optimization: What Can We Expect?", in Proceedings of the twenty-first ACM SIGMOD-SIGACT-SIGART symposium on Principles of database systems, Jun. 3, 2002, 10 pages.

Cole, et al., "Optimization of Dynamic Query Evaluation Plans", in Proceedings of the ACM SIGMOD international conference on Management of data, May 24, 1994, pp. 150-160.

Harish, et al., "On the Production of Anorexic Plan Diagrams", in Proceedings of the 33rd international conference on Very large data bases, Sep. 23, 2007, pp. 1081-1092.

Dey, et al., "Efficiently Approximating Query Optimizer Plan Diagrams", in Journal of the VLDB Endowment, vol. 1, Issue 2, Aug. 24, 2008, 12 pages.

Ganguly, Sumit, "Design and Analysis of Parametric Query Optimization Algorithms", in Proceedings of the 24rd International Conference on Very Large Data Bases, Aug. 24, 1998, pp. 228-238.

Ghazal, et al., "Dynamic plan generation for parameterized queries", in Proceedings of the ACM SIGMOD International Conference on Management of data, Jun. 29, 2009, pp. 909-916.

Ghosh, et al., "Plan selection based on query clustering", in Proceedings of the 28th international conference on Very Large Data Bases, Aug. 20, 2002, 12 pages.

Hulgeri, et al., "Parametric query optimization for linear and piecewise linear cost functions", in Proceedings of the 28th international conference on Very Large Data Bases, Aug. 20, 2002, 12 pages.

Hulgeri, et al., "AniPQO: almost non-intrusive parametric query optimization for nonlinear cost functions", in Proceedings of the 29th international conference on Very large data bases, vol. 29, Sep. 9, 2003, 12 pages.

Ioannidis, et al., "Parametric query optimization", in International Journal on Very Large Data Bases, vol. 6, Issue 2, May 1997, pp. 132-151.

Krishnan, Lohit, "Improving Worst-case Bounds for Plan Bouquet based Techniques", in Thesis of Indian Institute of Science, Jun. 2015, 46 pages.

Lee, et al., "Closing the query processing loop in Oracle 11g", in Journal of the VLDB Endowment, vol. 1, Issue 2, Aug. 23, 2008, pp. 1368-1378.

Reddy, et al., "Analyzing plan diagrams of database query optimizers", in Proceedings of the 31st conference on Very large data bases, Aug. 30, 2005, pp. 1228-1239.

Topsøe, Flemming, "Some bounds for the logarithmic function", in Australian Journal of Mathematical Analysis and Applications, 2004, pp. 1-20.

Trummer, et al., "Probably Approximately Optimal Query Optimization", in Journal of the Computing Research Repository, Nov. 2015, pp. 1-12.

Trummer, et al., "An Incremental Anytime Algorithm for Multi-Objective Query Optimization", in Proceedings of the ACM SIGMOD International Conference on Management of Data, May 31, 2015, 13 pages.

Shearer, Brett, "Execution Plan Caching and Reuse", https://technet.microsoft.com/en-us/library/ms181055(v=sql.105).aspx, Dec. 2, 2015, 5 pages.

"Program for TPC-H Data Generation with Skew", https://www.microsoft.com/en-us/download/details.aspx?id=52430, Published on: Dec. 5, 2016, 6 pages.

"IBM Knowledge Center—REOPT bind option", https://www.ibm.com/support/knowledgecenter/en/SSEPEK_10.0.0/comref/src/tpc/db2z_bindoptreopt.htmlhttps:/www.ibm.com/support/knowledgecenter/en/, Retrieved on: May 10, 2017, 2 pages.

\* cited by examiner

RE-COSTING FOR ON-LINE OPTIMIZATION OF PARAMETERIZED QUERIES WITH GUARANTEES

RELATED APPLICATION

This application claims priority to U.S. Provisional Application Ser. No. 62/505,646 (entitled RE-COSTING FOR ON-LINE OPTIMIZATION OF PARAMETERIZED QUERIES WITH GUARANTEES, filed May 12, 2017) which is incorporated herein by reference in its entirety.

TECHNICAL FIELD

An embodiment of the present subject matter relates generally to database queries, and, more specifically, but without limitation, to processing a large number of instances of a parameterized structured query language (SQL) query in an on-line fashion while ensuring tight and bounded sub-optimality for each of those instances.

BACKGROUND

Various mechanisms exist for interacting with relational database systems. Applications often interact with relational database systems through parameterized queries, where the same SQL statement is executed repeatedly with different parameter instantiations. One approach for processing parameterized queries is to optimize each query instance, thereby generating the best plan for that instance (referred to as Optimize-Always). However, the drawback of this approach is that it can incur significant optimizer overheads, particularly for frequently executing or relatively inexpensive queries. Another simple approach, that is commonly used in today's commercial database systems, is to optimize the query for only one instance (e.g. the first query instance or an application specified instance), and reuse the resulting plan for all other instances (referred to as Optimize-Once). While the latter approach greatly reduces optimization overheads, the chosen plan may be arbitrarily sub-optimal for other query instances. Furthermore there is no way to quantify the sub-optimality resulting from Optimize-Once.

Existing parametric query optimization (PQO) techniques approach this problem by attempting to find a middle-ground between Optimize-Always and Optimize-Once. They store a small set of carefully chosen execution plans for a parameterized query rather than only one as in Optimize-Once. When a new query instance arrives they judiciously select one of these plans to use such that the cost of the selected plan is not much worse when compared to the cost of the plan if that query instance had been optimized (as in Optimize-Always). On-line techniques for PQO may make decisions progressively—as each new query instance arrives—on which stored plan to use for that instance (or to optimize the instance), and whether to update the set of plans stored. However, existing systems may fail to provide optimal results for many queries.

BRIEF DESCRIPTION OF THE DRAWINGS

In the drawings, which are not necessarily drawn to scale, like numerals may describe similar components in different views. Like numerals having different letter suffixes may represent different instances of similar components. Some embodiments are illustrated by way of example, and not limitation, in the figures of the accompanying drawings in which.

SUMMARY

Figure 1:
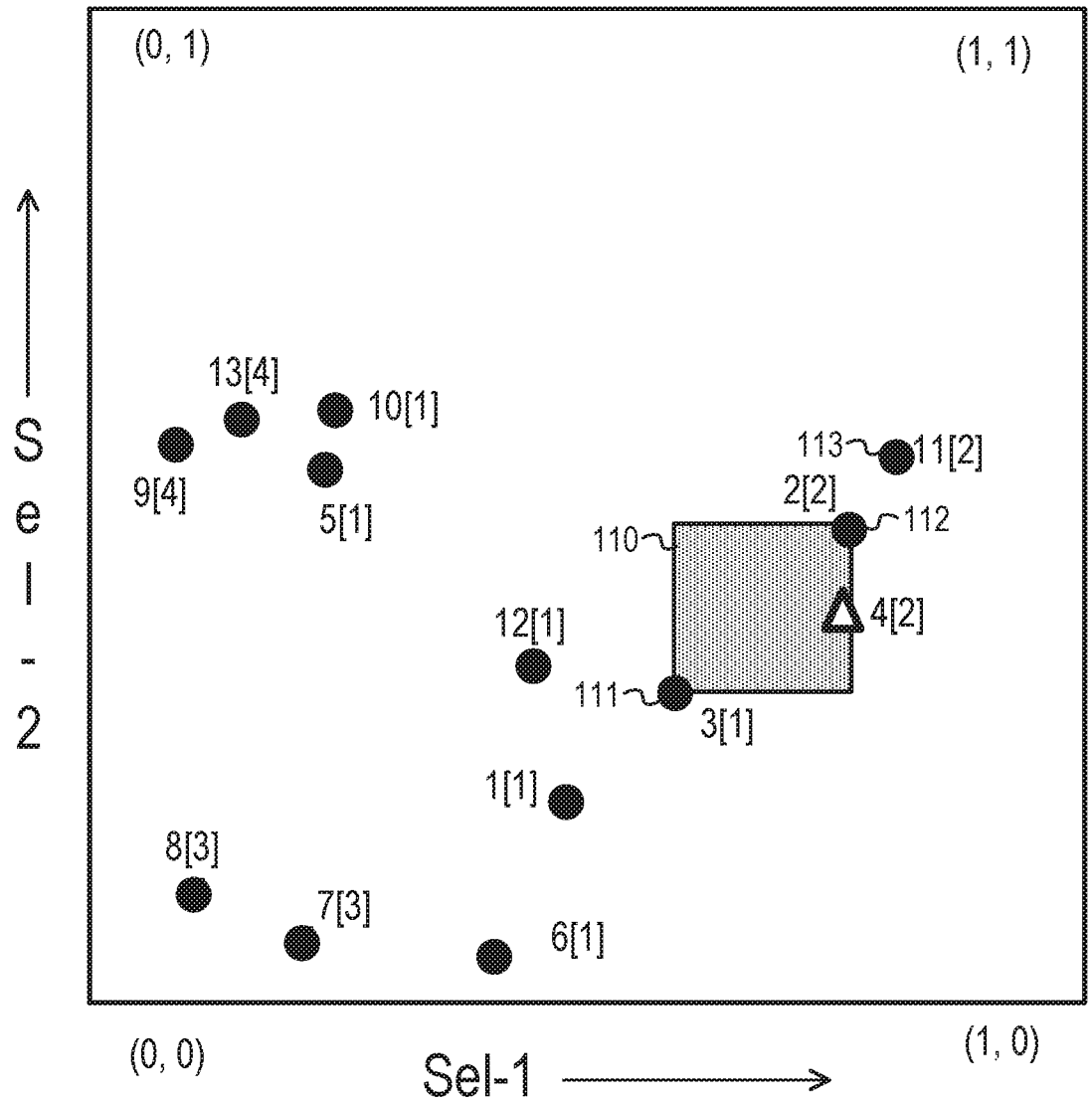
FIG. 1 illustrates inference regions for a PCM technique for a processing example of a 2-dimensional query.

Embodiments as described herein relate to processing a sequence of various query instances for parameterized queries, in an on-line fashion. An embodiment may use a method that both skips a large fraction of optimizer calls, and ensures tight and bounded sub-optimality, across the set of query instances. Further, embodiments may also manage the plan cache for the optimizer to store a smaller number of execution plans while supporting a bound on a number of stored plans.

An embodiment utilizes a method to calculate selectivities of the parameterized predicates to efficiently identify opportunities to skip optimizer calls while ensuring tight, bounded sub-optimality. If the selectivity check fails, an efficient Re-cost feature may be used to find a suitable within an optimality region, before resorting to calling the optimizer. Use of a Re-cost feature for rejecting a new or existing plan without violating the guarantee of tight and bounded sub-optimality. An embodiment may efficiently manage cache by dropping redundant plans from the plan cache, or aging out old, unused plans, without violating the guarantee of tight and bounded sub-optimality.

DETAILED DESCRIPTION

In the following description, for purposes of explanation, various details are set forth in order to provide a thorough understanding of some example embodiments. It will be apparent, however, to one skilled in the art that the present subject matter may be practiced without these specific details, or with slight alterations.

An embodiment of the present subject matter is a system and method relating to using selectivity and cost checks to minimize optimizer calls while maintaining bounds on sub-optimal costs for parameterized query optimization systems. An embodiment, may manage a plan cache to minimize redundancy in the cache and maintain an optimal number of query plans. An embodiment may use a Recost method that may mimic redundancy checks, as described herein, that may be used with existing methods.

Reference in the specification to "one embodiment" or "an embodiment" means that a particular feature, structure or characteristic described in connection with the embodiment is included in at least one embodiment of the present subject matter. Thus, the appearances of the phrase "in one embodiment" or "in an embodiment" appearing in various places throughout the specification are not necessarily all referring to the same embodiment, or to different or mutually exclusive embodiments. Features of various embodiments may be combined in other embodiments.

For purposes of explanation, specific configurations and details are set forth in order to provide a thorough understanding of the present subject matter. However, it will be apparent to one of ordinary skill in the art that embodiments of the subject matter described may be practiced without the specific details presented herein, or in various combinations, as described herein. Furthermore, well-known features may be omitted or simplified in order not to obscure the described embodiments. Various examples may be given throughout this description. These are merely descriptions of specific embodiments. The scope or meaning of the claims is not limited to the examples given.

The effectiveness of any on-line solution to parametric query optimization (PQO) may be measured using three metrics: (a) cost sub-optimality, e.g., cost of the selected plan relative to the cost of the optimal plan for each query instance; (b) optimization overheads, e.g., fraction of query instances that are optimized; and (c) number of plans stored. An ideal on-line PQO solution would guarantee a tight bound on cost sub-optimality, optimize only a small fraction of query instances, and store only a few plans.

Existing on-line approaches to PQO typically fall short on one or more of the above three metrics. Specifically, one prior on-line approach that attempts guarantees of bounded cost sub-optimality is Plan Cost Monotonicity (PCM). To provide this guarantee, PCM assumes that the cost of a plan increases monotonically with selectivity. The drawbacks of the PCM technique are that it optimizes a large fraction of query instances and requires a large number of plans to be stored. In contrast, heuristic approaches to on-line PQO may be successful in significantly lowering the optimization overhead. However, these heuristic approaches may be susceptible to incur unbounded cost sub-optimality, and require a large number of plans to be stored.

Embodiments as described herein utilize a new technique for on-line PQO that, given a bound on cost sub-optimality that can be tolerated, effectively addresses all three metrics above, based on combining the following concepts: selectivity check; cost check; and redundancy check.

As discussed herein, a selectivity check may determine if the optimal plan for a previously optimized query instance $q_a$ may also be used for a new query instance $q_b$, while guaranteeing that a plan's cost sub-optimality is within the specified bound. This selectivity check is efficient because it only requires comparing the selectivities of parameterized predicates of $q_a$ with the corresponding selectivities of $q_b$. The soundness of the selectivity check is based on a conservative assumption on how rapidly the cost of a plan changes with selectivity. If the selectivity check is successful, then a previously stored plan may be reused for the query instance $q_b$, thereby reducing optimization overheads (since another optimizer call is avoided).

As discussed herein, a cost check may be performed when the selectivity check fails for a query instance. In an embodiment, the cost-check may be implemented with a new Recost API as part of the database engine. The Recost API may compute the cost of using the optimal plan associated with an already optimized instance $q_a$, for a new query instance $q_b$. Using this cost, and the selectivities of $q_a$ and $q_b$, the cost check may determine whether the optimal plan for $q_a$ may be used for $q_b$ while still guaranteeing the same bound on plan cost sub-optimality. Although the Recost API may be more expensive than a selectivity check, a Recost process may still be much faster than a traditional optimizer call (e.g., Recost check may be up to two orders of magnitude faster than an optimizer call). Hence, if the cost check passes, then the process may achieve significant reduction in optimization overheads. The authors have observed that many query instances that fail the selectivity check may typically pass the cost check, and can therefore still use a stored plan with bounded cost sub-optimality.

As discussed herein, a redundancy check may apply when both the selectivity and Recost check, above, fail. In this case, the new query instance $q_b$ should be optimized with the optimizer. This optimization may result in a new plan. The new plan may be checked to determine whether it is redundant with respect to an existing stored plan, e.g., whether one of the stored plans may ensure bounded cost sub-optimality for $q_b$. Otherwise, the new plan may be added to the set of stored plans. Thus, only non-redundant plans are stored, thereby reducing the memory required. The redundancy check may also leverage the Recost API.

Embodiments as discussed herein may be referred to as "SCR" for simplicity (e.g., for characteristics of exploiting three checks: selectivity, cost, redundancy). It should be noted that embodiments of the SCR technique may also guarantee an upper limit on number of stored plans without compromising guarantees on cost sub-optimality. Although limiting the number of stored plans may increase optimization overheads, empirical experimentation shows that this increase is not significant for practical settings.

FIGS. 1-4 illustrate inference regions for various techniques of PQO, while processing an example workload for a 2-dimensional query, according to an embodiment. FIG. 1 illustrates an example for a PCM technique. To better understand embodiments described herein, and comparison to existing techniques, terminology used and issues of the topic are discussed below.

Given a parameterized query (e.g., query template) Q, the term dimensions is used for the number of parameterized predicates and denoted with d. A query instance $q_e$ refers to an example instance of Q, and a vector s Vector$_e$ is a compact representation of instance $q_e$ that captures corresponding selectivities for the parameterized predicates, e.g. ($s_1, s_2, \ldots, s_d$). Further, for example query instance $q_e$, the optimal plan, as determined by the query optimizer, is denoted with $P_{opt}(q_e)$. For a given plan P and query instance $q_e$, the optimizer estimated cost is denoted with Cost(P, $q_e$). A workload W may be defined to be a sequence of query instances for the query template Q, i.e., W=<$q_1, q_2, \ldots,$ >. Finally, P denotes the set of all plans that are optimal for at least one query instance in W, and n denotes the cardinality of P.

An on-line PQO technique should decide which plan to use for each incoming query instance in an on-line fashion. It may do so by storing a set of plans in a plan cache and then deciding whether to pick one of the cached plans or make an optimizer call to identify an optimized plan not in cache. In existing systems, this may usually be done by associating each plan with an inference region, e.g., selectivity region where the plan may be reused. At any intermediate state, the query instance currently being processed may be referred to as $q_c$ and the set of previously processed instances may be referred to as $W_{past}$.

As discussed above, three metrics may be used to evaluate the quality of the PQO technique. The following set of metrics may be considered for comparison and performance evaluation of on-line PQO techniques cost sub-optimality, optimization overheads, and number of plans cached.

Cost Sub-Optimality:

For query instance $q_e$, let $P(q_e)$ denote the plan used by the on-line technique. Then sub-optimality for $q_e$ is defined as $$SO(q_e) = \left( \frac{Cost(P(q_e), q_e)}{Cost(P_{opt}(q_e), q_e)} \right).$$

Any plan P, for which $1 < SO(q_e) \leq \lambda$, is termed as $\lambda$-optimal plan for $q_e$. Further, the worst case sub-optimality may be measured across the workload sequence using the maximum sub-optimality cost (MSO) defined as follows:

$$MSO = \max_{q_e \in W} (SO(q_e))$$

Since MSO captures only worst case performance and does not reflect whether such cases are frequent or rare, the aggregate performance of the technique may be measured over the given workload using TotalCostRatio defined as:

$$TotalCostRatio = \frac{\sum_{q_e \in W} Cost(P(q_e), q_e)}{\sum_{q_e \in W} Cost(P_{opt}(q_e), q_e)}.$$

It may be observed that TotalCostRatio falls in the range [1, MSO], and lower values indicate better performance.

Optimization Overheads:

The term numOpt may be used to denote the number of optimizer calls made across the workload. The average overhead for picking a plan from the cache may be considered, whenever the optimizer is not invoked.

Number of Plans Cached:

The maximum number of plans stored in the plan cache may be denoted as numPlans. Other bookkeeping memory overheads may be considered, as required to maintain a set of plans and support the decision of plan picking for a new query instance.

For the purpose of evaluation, a fixed length workload may be generated, such that $|W|=m$, in which case numPlans$\leq$numOpt$\leq$m. Also, only optimizer estimated costs may be used in the evaluation since the execution times may suffer high variability in dynamic execution environments (system load, concurrency, available memory etc.), which is an orthogonal problem.

Optimize-Always and Optimize-Once are alternative techniques that presume extreme settings, for instance, where numPlans=0 and numOpt=1, respectively, but may be highly wasteful or sub-optimal otherwise. The existing on-line PQO techniques try to minimize numOpt, either while guaranteeing an upper bound on the MSO (PCM), or with no bound on MSO at all (Ellipse, Density, Ranges). Also, the existing techniques do not support a limit on numPlans, an important metric in practice. The Ranges technique is so named because the technique stores a plan with a selectivity range around the corresponding optimized instance and reuses the plan whenever any new instance falls within the selectivity range.

Embodiments described herein focus on designing an on-line PQO technique that aims to minimize optimizer overheads while ensuring that every processed query instance q satisfies $SO(q) \leq \lambda$, where $\lambda \geq 1$ is an input parameter. In an embodiment, a variant of the above problem with an additional constraint that the number of plans stored in the plan cache cannot exceed $k \geq 1$ may be applied.

Existing techniques may use varying plan inferencing criteria. For instance, for PCM, the current query instance $q_c$ lies in a rectangular region created by a pair of previously optimized query instances such that one dominates the other in the selectivity space and their optimal costs are within $\lambda$-factor. For Ellipse, $q_c$ lies in an elliptical neighborhood of a pair of previously optimized instances with the same optimal plan. For Ranges, $q_c$ lies in a rectangular neighborhood enclosed by a minimum bounding rectangle for all previously optimized instances with the same optimal plan. And for Density, $q_c$ has sufficient number of instances with the same optimal plan choice in a circular neighborhood.

Examples below are for a workload consisting of 13 query instances which are marked in the figures as i[j], where i represents $i^{th}$ query instance $q_i$ and j denotes $j^{th}$ plan $P_j$ which is optimal plan for $q_i$, i.e., $P_{opt}(q_i)$. The comparative performance of some existing techniques including a glimpse of the proposed technique SCR, as discussed herein, is visually captured in FIGS. 1-4. A Density illustration is omitted, for brevity.

For existing techniques, the reuse of a stored plan P is possible only after workload has provided two or more instances that satisfy certain pre-conditions. Such restrictions may prevent reuse of a suitable plan that already exists in plan cache. For instance, PCM or Density cannot make any inference using plan $P_1$ even after it was known to be optimal for many instances ($q_1$, $q_3$, $q_5$, etc.). Thus, these existing techniques may call the optimizer many more times than necessary, significantly affecting optimizer overhead.

Existing plan inference techniques that use selectivity-based neighborhoods can seriously compromise MSO, since they do not take into account the cost behavior of the inferred plan or optimal plan. In the example workload, while the elliptical region around $q_1$ and $q_5$ provides optimal plans for $q_{10}$ and $q_{12}$, it also results in a sub-optimal plan ($P_1$) for $q_{13}$. Similarly for Ranges, the rectangular neighborhood for plan $P_1$ containing instances $q_1$, $q_5$ and $q_6$ provides an optimal plan for $q_{10}$ and $q_{12}$ but also leads to selection of sub-optimal plan ($P_1$) for $q_7$. Further, the absence of any mechanism to detect sub-optimality of inferred plan choices, may lead to repeated mistakes in plan inferences and hence high values of TotalCostRatio. For example, any instance close to $q_7$ would be assigned plan $P_1$ by Ranges. Finally, Density would also wrongly assign $P_1$ to $q_{13}$. Density based clustering is a well understood concept, and will not be discussed in detail, for brevity. Thus, existing plans may not provide appropriate cost sub-optimality.

Existing techniques mostly use trivial policies for managing the plan cache, e.g. store every new plan and never drop a plan. As a result, they are prone to storing a large number of plans. For example, some existing techniques store hundreds of plans (for $d \geq 3$). Note that, the example workload does not highlight this limitation of existing techniques (e.g., all examples store four plans). Overall, none of the existing techniques provide the ability to control cost sub-optimality and number of plans, while also achieving significant reduction in optimizer overheads.

FIG. 1 illustrates inference regions for a PCM technique for a processing example of a 2-dimensional query. The x[y] identifiers represent instance $q_x$ with optimal plan $P_y$. The square region 110 represents an inference region generated with a PCM technique. A triangle associated with a query instance indicates an inferred instance. A dot associated with a query instance indicates an optimized instance, e.g., a plan generated by an optimizer run. It may be seen that $q_3$ was optimized for plan $P_1$ (e.g., 3[1]) 111. Query $q_2$ optimized for $P_2$ (e.g., 2[2]) 112 may also be seen included in the inference region 110. Query $q_4$ falls within region 110, so it may be inferred to use plan $P_2$. However, it can be seen that inference region 110 includes a $q_3$ which should use $P_1$. Other queries using $P_1$ (e.g., 10[1], 5[1], 12[1], 1 [1], and 6[11]) fall outside of the region 110. It may be deduced that using this PCM technique that $q_3$ may be incorrectly executed with $P_2$ instead of $P_1$. It may also be seen that $q_{11}$ is inferred to use $P_2$ (e.g., 11 [2]) 113, but falls outside region 110. Thus, the PCM technique may be both over inclusive and under inclusive with respect to query plan inferencing.

Figure 2:
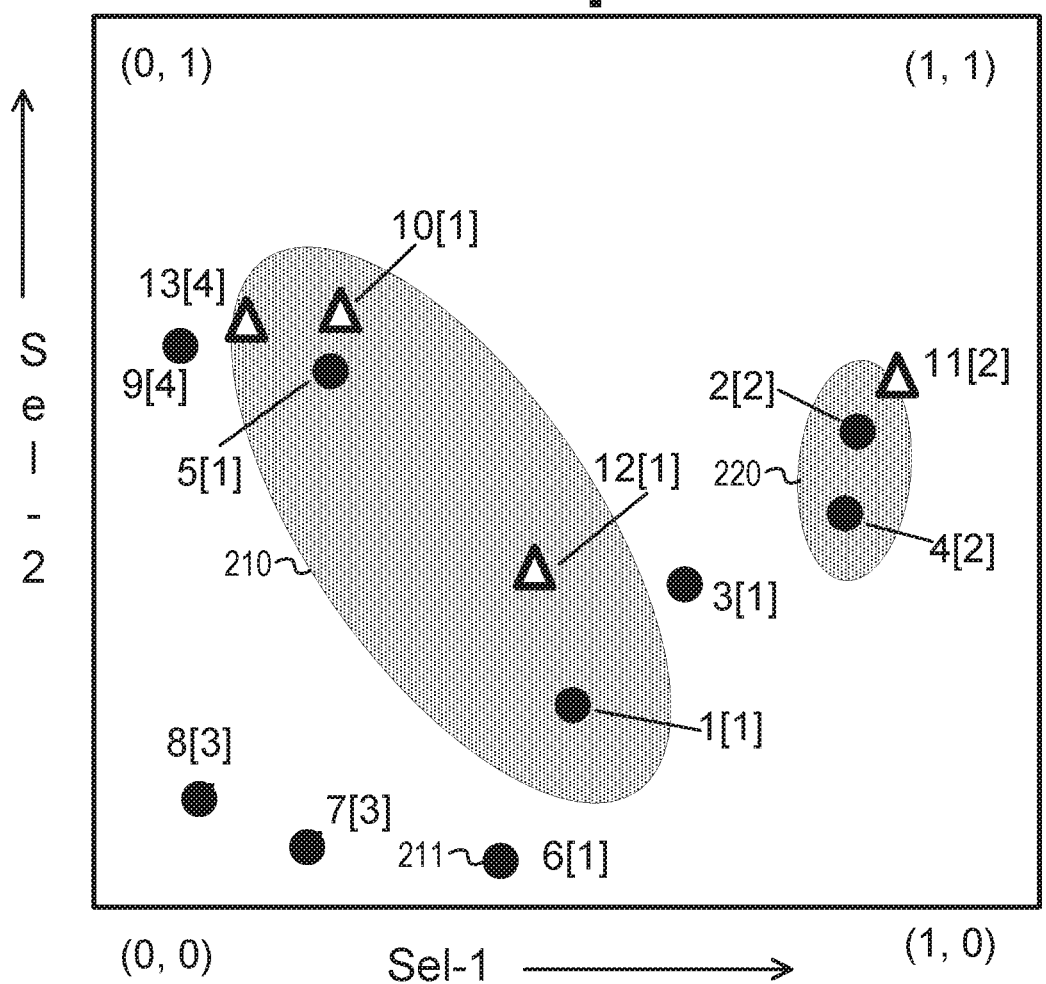
FIG. 2 illustrates inference regions for an Ellipse technique for a processing example of a 2-dimensional query.

FIG. 2 illustrates inference regions for an Ellipse technique for a processing example of a 2-dimensional query. Here, two elliptical inference regions are shown, 210, 220. Region 210 represents the inference region for $P_1$, and region 220 represents the inference region for $P_2$. This technique also has problems with under inclusion (e.g., 6[1]) 211. Query $q_6$ (211) should be within the inference area for $P_1$ 210, but it is not. Thus, another optimization call will unnecessarily result when $q_6$ is requested.

Figure 3:
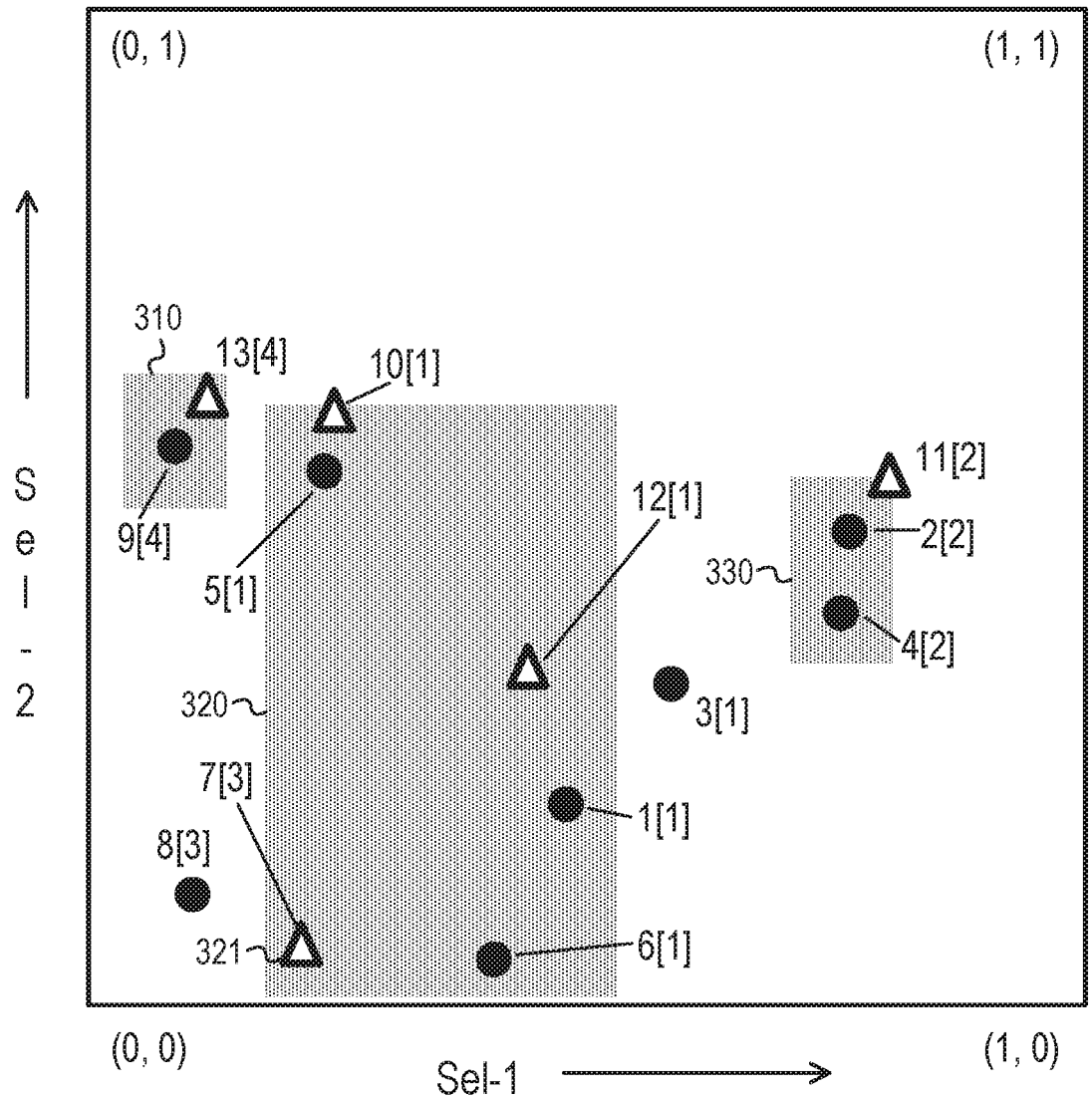
FIG. 3 illustrates inference regions for a Ranges technique for a processing example of a 2-dimensional query.

FIG. 3 illustrates inference regions for a Ranges technique for a processing example of a 2-dimensional query. Here, three rectangular inference regions are shown, 310, 320, and 330. In this example, $P_4$ is used for region 310. $P_1$ is used for region 320; and $P_2$ is used for region 330. This method also has issues with over inclusion. For instance, $q_7$ (321) is shown within inference region 320 to use $P_1$. However, as shown, $q_7$ should be using $P_3$.

Figure 4:
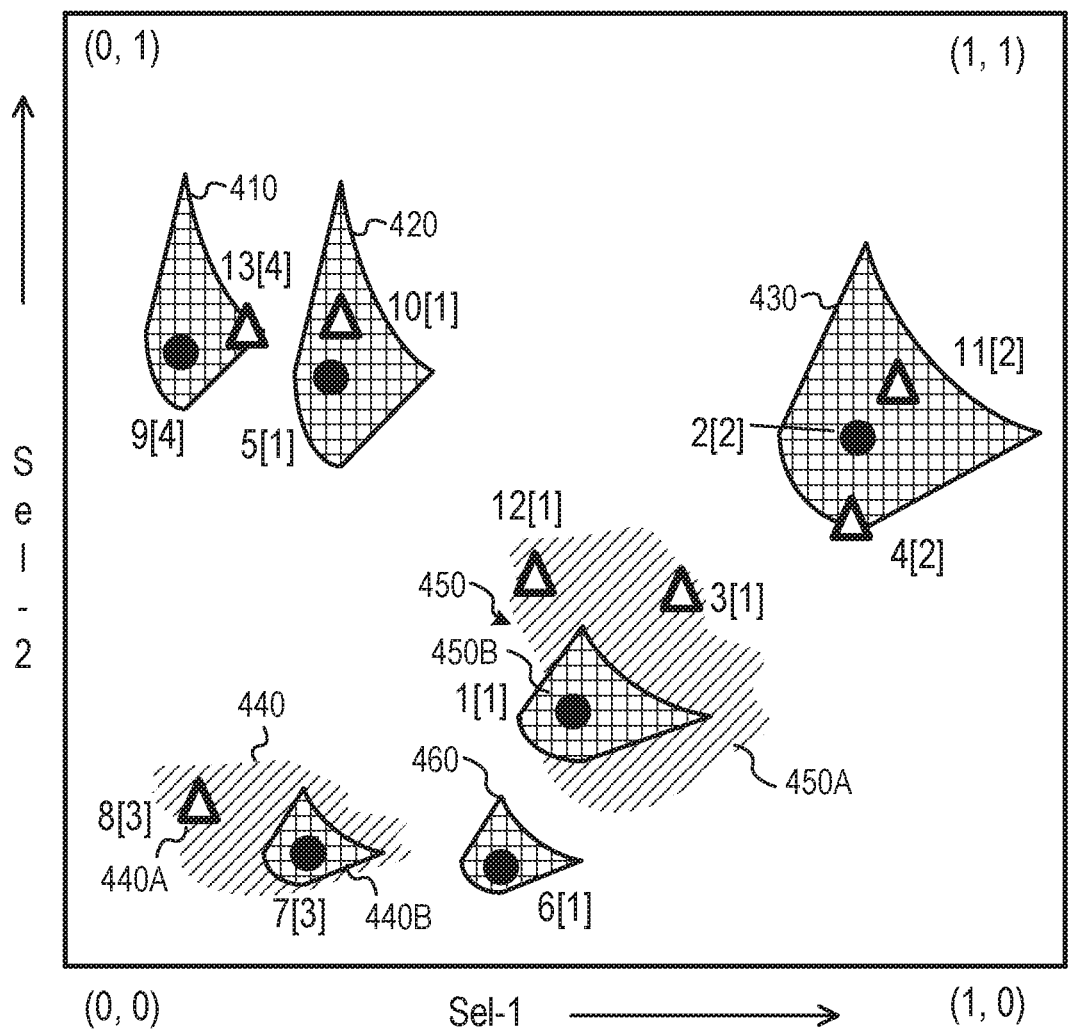
FIG. 4 illustrates inference regions for an selectivity, cost, redundancy (SCR) technique for a processing example of a 2-dimensional query, according to an embodiment.

FIG. 4 illustrates inference regions for an SCR technique for a processing example of a 2-dimensional query, according to an embodiment as disclosed herein. Here, six inference regions are shown, 410, 420, 430, 440, 450 and 460. As shown, region 410 is associated with queries to use $P_4$; region 420 is associated with queries to use $P_1$; region 430 is associated with queries to use $P_2$; region 440 is associated with queries to use $P_3$; region 450 is associated with queries to use $P_1$; and region 460 is associated with queries to use $P_1$. It may be seen that the regions as formed using an SCR technique may solve the problems of over and under inclusion better than existing techniques. As shown, none of the regions include a query where optimization should be for a different plan than other queries in the region. Three regions are formed for queries using $P_1$ (e.g., regions 420, 450 and 460), rather than forming one large region for $P_1$ that might encompass queries best optimized with different plans. Further, there are two types of regions shown for regions 440 and 450. For instance, region 440 includes a cost check region 440A and a selectivity check region 440B. Similarly, region 450 includes a cost check region 450A and a selectivity check region 450B. As discussed further below, embodiments disclosed herein may perform a selectivity check and if that fails, then also perform a cost check to determine the appropriate plan to use for a query. In an embodiment, only when both the selectivity check and cost check both fail is the optimizer executed to form the optimization plan for the query.

Figure 5:
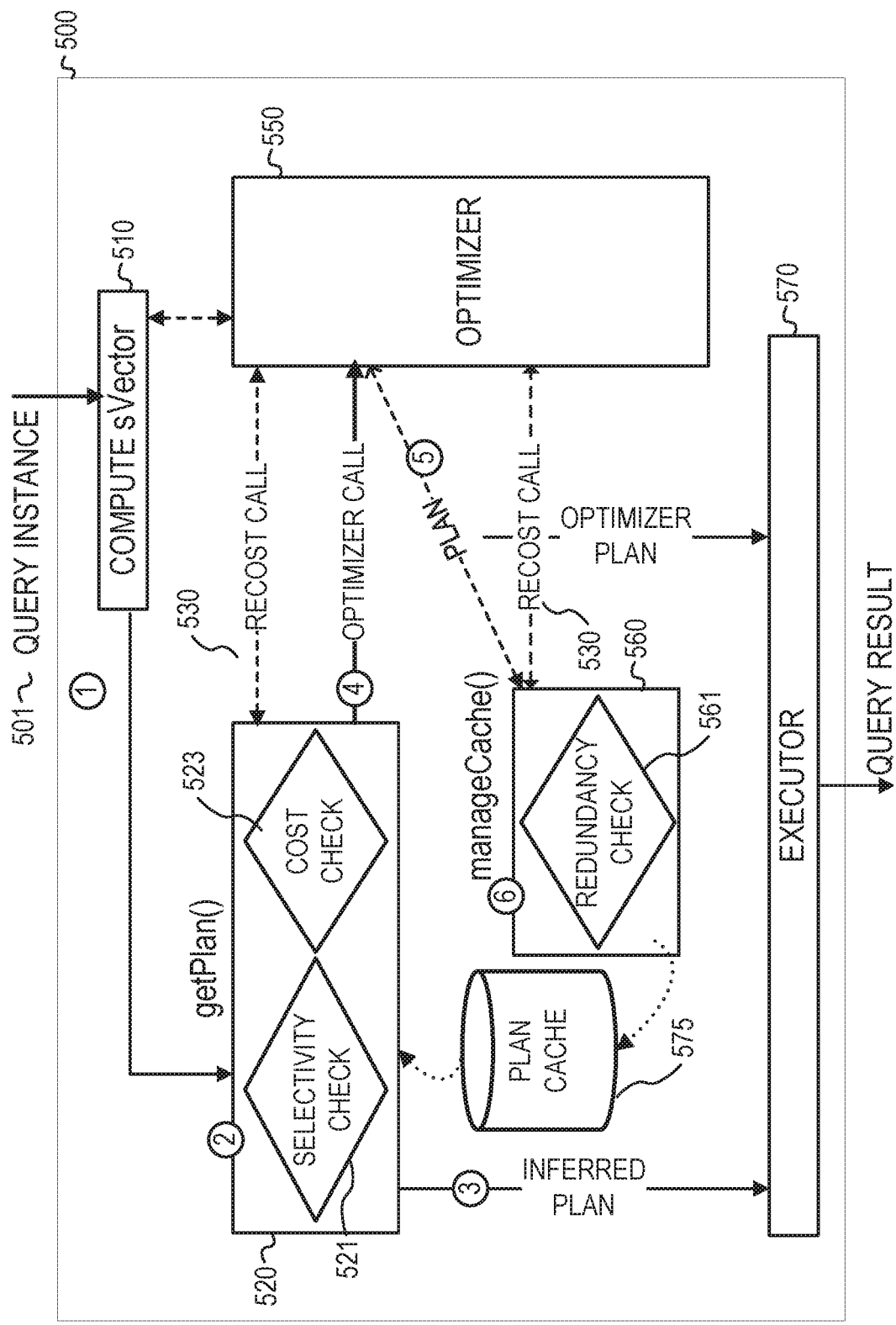
FIG. 5 is a block diagram illustrating a system for performing an SCR query optimization for PQO operations, according to an embodiment.

FIG. 5 is a block diagram illustrating a system for performing an SCR query optimization for PQO operations, according to an embodiment. In an embodiment, a query instance $q_c$ 501 may be received by the database server 500. The selectivity vector, sVector$_c$, may be computed at block 510. In an embodiment, the selectivity vector is generated using an API call. In an example, given a query instance $q_c$, the API may efficiently compute and return s Vector$_c$.

The sVector may be sent to get Plan logic 520. The get Plan logic 520 may include logic, instructions or circuitry to perform the selectivity check 521 and to perform the cost check 523. The get Plan logic 520 may determine whether a plan $P(q_c)$ exists in the plan cache 575 for $q_c$, or whether the optimizer 550 must be called to generate an optimized plan for $q_c$. If $q_c$ is optimized, then plan $P_{opt}(q_c)$ is obtained, which may then fed to the manageCache logic 560. When the selectivity check 521 passes, an inferred plan may be retrieved from the plan cache 575 and sent to the executor 570 for query plan execution. If the selectivity check 521 fails, then a cost check may be performed 523. When the cost check 523 passes, an inferred plan may be retrieved from the plan cache 575 and sent to the executor 570 for query plan execution. If both the selectivity check 521 and cost check 523 fail, then the optimizer 550 may be called to generate an optimized plan for $q_c$. The newly generated plan for $q_c$ may be stored in the plan cache 575, for reuse with other queries in the same inference region. The newly optimized plan may be sent to the executor 570. A more detailed description of the Get Plan logic is discussed below, in conjunction with FIG. 7.

Figure 6:
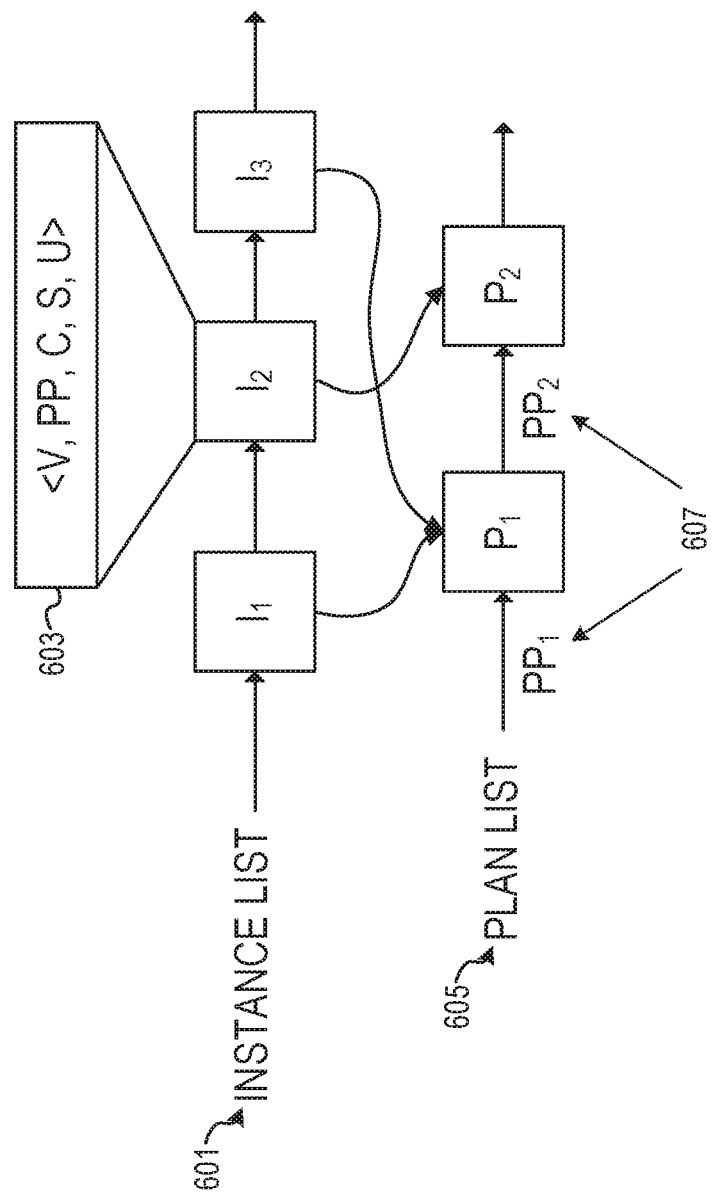
FIG. 6 is a diagram illustrating the plan cache data structure, according to an embodiment.

In an embodiment, a manageCache function 560 may be used to perform a redundancy check 561 on the plan, and manage the plan cache 575, generally. At any intermediate stage, the plan cache 575 may store a set of plans and extra information to capture their inference regions. The stored set of plans may be denoted as $P_C$. If the plan cache 575 already has the same plan as generated by the optimizer 550, then the new plan is redundant, and need not be stored in the plan cache. If an optimized plan that is within a λ-optimality region for the query $q_c$ exists in the plan cache 575, then the existing plan may be identified for use with the query and the new plan need not be stored. The manageCache function 560 may also age out plans that have not been used in a pre-determined period, or have very low usage counts, to avoid stale and/or underused plans taking up space in the plan cache 575. In an embodiment, the manageCache function 560 may be performed concurrently, in parallel, or asynchronously with optimization 550 and the get Plan 520 functions. For instance, the manageCache logic 560 may make decisions regarding the state of plan cache 575. In an example, if $P_{opt}(q_c)$ is found to already exist in plan cache 575, then the manageCache logic may determine how to modify its inference region. In an example, if $P_{opt}(q_c)$ is not found in the plan cache 575, then the manageCache logic may determine whether to store the optimized plan or not. In an example, for each of the existing plans in plan cache, the manageCache logic may determine whether to drop the existing plan from the plan cache, or keep the plan in the plan cache 575. Since manageCache does not need to occur on the critical path of query execution, it may be implemented asynchronously on a background thread. FIG. 6, described more fully below, illustrates the plan cache data structure, according to an embodiment. A more detailed description of the manageCache logic is described below in conjunction with FIG. 8.

In a comparison test of PQO techniques, embodiments of SCR may invoke optimizer calls for only six instances, whereas PCM may require 12, and best heuristic technique required eight optimizer calls. For every optimized instance $q_i$ in FIG. 4, the surrounding region (e.g., smaller grid region with dark boundary) represents the set of all possible instances that may satisfy the selectivity check with respect to $q_i$ and is termed as inference region due to selectivity check. Similarly, for some instance ($q_1$ and $q_7$) the inference region due to cost check is also highlighted (e.g., diagonal shading without boundary). For $q_4$ and $q_{11}$, it infers plan $P_2$ since they satisfy the selectivity check for $q_2$ and hence avoids optimizer calls. The plans for $q_{10}$ and $q_{13}$ are also inferred due to the selectivity check. Further, plan $P_1$ is chosen for $q_3$ because the cost check with $q_1$ succeeds even though selectivity check fails. Likewise, plans for $q_8$ and $q_{12}$ are inferred due to the cost check. In short, embodiments of the SCR technique may save significantly more optimizer calls than PCM and do not pick sub-optimal plans like some heuristic techniques.

In an embodiment, the database engine on the server 500 may support two APIs in addition to the traditional optimizer call. The Get Plan logic 520 may support an API for computing selectivity vector 510, and a Re-cost API 530. In an example, given a plan P and a query instance $q_c$, the Recost API may efficiently compute and return Cost(P, $q_c$). It may be noted that the selectivity vector is a generic requirement across existing on-line PQO techniques. Some existing on-line PQO methods may use a semblance of a recost module. However, embodiments as described herein utilize an efficient Recost API that is much more efficient compared to an optimizer call. Further, the use of selectivity checks and cost checks, as described herein, have not been combined as described.

An embodiment utilizes a two-step check to make the decision to optimize or not for new instance $q_c$. The first check, called the selectivity check 521, takes two sVectors for $q_e$, $q_c$ and the sub-optimality requirement $\lambda$ as input and returns true only if plan $P_{opt}(q_e)$ may be inferred to be $\lambda$-optimal at $q_c$. This decision may be based purely on the sVectors and an assumption on plan cost functions. Only when this selectivity check fails is the cost check 523 invoked. A Recost API feature may be used to compute the cost of one or more stored plans for query instance $q_c$ to check whether one of these plans may be inferred to be $\lambda$-optimal for $q_c$. If both checks fail to identify a plan, an optimization call to optimizer 550 may be made for $q_c$.

An embodiment determines if a plan already exists in the plan cache and may be reused for a new query instance while guaranteeing $\lambda$-optimality. This forms the basis of inferring $\lambda$-optimality regions around each optimized instance and leads to the construction of selectivity and cost checks of the get Plan logic. The $\lambda$-optimality guarantee is based on the assumption of bounded cost growth for plans, whose validity has been examined for typical physical operators in a relational database system.

Plan Reuse Approach

An optimized query instance $q_e$ provides plan $P_{opt}(q_e)$. The sub-optimality of $P_{opt}(q_e)$ when used for another query instance $q_c$ is given by:

$$SubOpt(P_{opt}(q_e), q_c) = \frac{Cost(P_{opt}(q_e), q_c)}{Cost(P_{opt}(q_c), q_c)}.$$

The challenge is that computing exact value of sub-optimality may not be possible without making an optimizer call for $q_c$, which would defeat the very purpose of plan reuse. In an embodiment, an upper bound on the value of SubOpt($P_{opt}(q_e)$, $q_c$) is inferred by utilizing an upper bound on the cost of the numerator and a lower bound on the cost of the denominator. Such cost bounds may be computed by using the selectivity ratios between $q_e$ and $q_c$ under bounded cost growth assumption on plan cost functions. Further, the above sub-optimality bound may be further tightened when the exact value of the numerator can be obtained. Computing the numerator requires only re-costing of plan $P_{opt}(q_e)$ for query instance $q_c$. This technique may yield up to two orders of magnitude faster than an optimizer call.

The above plan reuse approach is not restricted only to the optimal plan for $q_e$, and may be utilized for any generic plan P as long as its sub-optimality at $q_e$ is known. This property may be exploited, for instance in the manageCache logic 560, to retain only a subset of optimal plans without violating $\lambda$-optimality.

Bounded Cost Growth (BCG) Assumption

An embodiment may be seen as an extension of the Plan Cost Monotonicity (PCM) assumption that has been used in past work. Assumptions used for the plan cost functions are:
  plan cost functions are smooth;
  other factors that may influence plan costs. e.g. join-selectivities, main memory etc., remain the same across all query instances; and
  selectivity independence between base predicates.

Consider a plan P whose cost at query instance $q_0=(s_1, s_2)$ of a 2-dimensional query is C. Also consider query instances $q_1=(\alpha_1 s_1, s_2)$ and $q_2=(s_1, \alpha_2 s_2)$, with $\alpha_1, \alpha_2 > 1$. A visual representation of such instances is provided in FIG. 9. Note that a 2-dimensional query template is discussed for the sake of presentation and the arguments may be generalized for n-dimensions in a straightforward manner.

A PCM assumption means that the cost of a plan increases with an increase in each individual selectivity, e.g., (a) Cost(P, $q_1$)>C. and (b) Cost(P, $q_2$)>C. Thus, embodiments described herein provide a lower bound on cost of P at $q_1$ and $q_2$.

A BCG assumption described is an extension to the PCM assumption where it is also assumed that for every individual selectivity dimension, if the selectivity value increases by a factor $\alpha$, then the resulting increase in cost of P is upper bounded by a known function of a. Thus, the Cost C may be described as, $$C < Cost(P, q_1) \leq f_1(\alpha_1)C, \text{ and} \quad (a)$$

$$C < Cost(P, q_2) \leq f_2(\alpha_2)C, \quad (b)$$

where both $f_1$ and $f_2$ are increasing functions defined over the domain (1, $\infty$). Similar assumption has also been used previously in different contexts.

Figure 9:
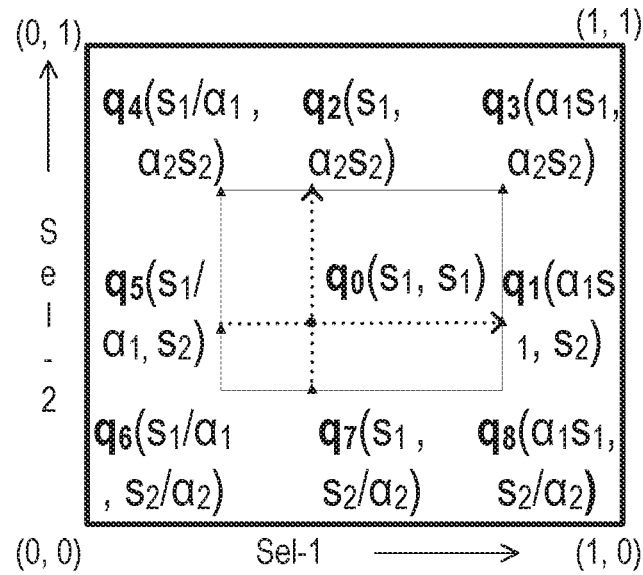
FIG. 9 is a visual representation of neighboring instances of $q_0$, according to an embodiment.

Cost implications of PCM and BCG assumptions on query instances $q_3$ through $q_8$ may be analyzed, and whose selectivity vectors are shown in FIG. 9. For $q_3=(\alpha_1 s_1, \alpha_2 s_2)$, the PCM assumption implies cost lower bound, e.g., Cost(P, $q_3$)>C, while successive application of BCG assumption implies both lower and upper bounds on cost of P, e.g., $C < Cost(P, q_3) \leq f_1(\alpha_1) f_2(\alpha_2) C$.

For $$q_5 = \left(\frac{s_1}{\alpha_1}, s_2\right),$$

PCM provides an upper bound on the cost of P by considering $q_5$ as the reference for $q_0$, that is, Cost(P, $q_0$)>Cost(P, $q_5$)⇒Cost(P, $q_5$)<C. On the other hand, BCG again provides lower as well as upper bounds on cost such that:

$$\Rightarrow \frac{C}{f_1(\alpha_1)} < \text{Cost}(P, q_5) < C.$$

The case of $$q_4 = \left(\frac{s_1}{\alpha_1}, \alpha_2 s_2\right)$$

is interesting since selectivity increases in one dimension and decreases in the other. In this case, PCM cannot provide any bound on cost of P. In contrast, BCG still provides both lower and upper bounds on the cost of P as follows:

Cost(P,$q_5$)<Cost(P,$q_4$)<$f_2(\alpha_2)$Cost(P,$q_5$).

The cost bounds for $q_5$ may be used to derive, $$\frac{C}{f_1(\alpha_1)} < \text{Cost}(P, q_4) < f_2(\alpha_2)C.$$

Figure 10:
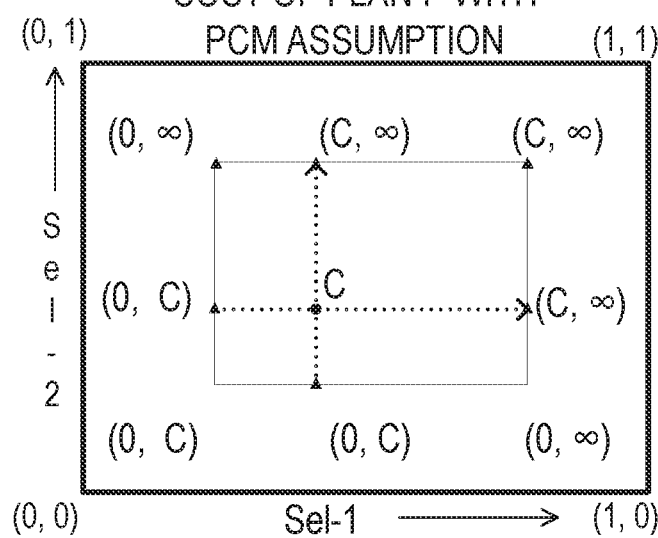
FIG. 10 is a visual representation of cost of P in terms of C with a PCM assumption, according to an embodiment.
Figure 11:
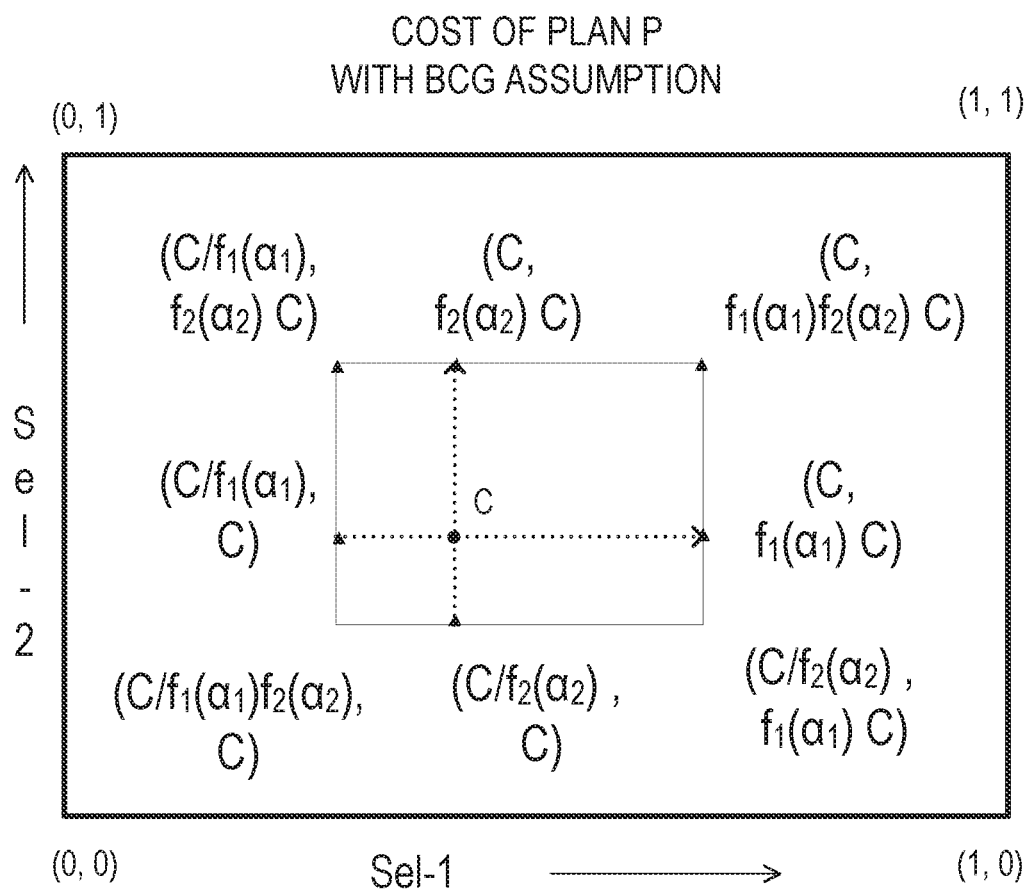
FIG. 11 is a visual representation of cost of P in terms of C with a BCG assumption, according to an embodiment.

In a similar manner, the cost lower and upper bounds for $q_6$, $q_7$ and $q_8$ may also be inferred using BCG assumption. The cost bounds are shown in FIG. 10 for PCM and FIG. 11 for BCG.

Constructing λ-Optimal Region

The cost implications of the BCG assumption may be formalized to define cost and sub-optimality bounds for plan $P_{opt}(q_e)$ for a generic neighboring query instance $q_c$. These bounds may be used to construct λ-optimal region for $P_{opt}(q_e)$ around $q_e$. In this analysis, the assumption $f_i(\alpha)=\alpha$ may be followed.

Consider two query instances $q_e$ and $q_c$, let $P_e$ and $P_c$ denote their optimal plan choices and $(\alpha_1, \alpha_2, \ldots, \alpha_d)$ be the vector of selectivity ratios between their sVectors with each $$\alpha_i = \frac{s_i(q_c)}{s_i(q_e)}.$$

Further, let $$L = \prod_{\alpha_i < 1} \frac{1}{\alpha_i},$$

denote the net cost decrement factor due to selectivity ratios. Similarly, let $$G = \prod_{\alpha_i > 1} \alpha_i$$

denote the net cost increment factor between $q_e$ and $q_c$. The following gives cost bounds for $P_e$ at arbitrary instance $q_c$. Under the assumption that the bounding functions are known to be $f_i(\alpha_i)=\alpha_i$, Cost($P_e$, $q_c$) satisfies the following bounds, $$\frac{\text{Cost}(P_e, q_e)}{L} < \text{Cost}(P_e, q_c) < G \times \text{Cost}(P_e, q_e).$$

A theorem bounds the sub-optimality of $P_e$ at generic instance $q_c$, e.g., Sub-optimality Bound Theorem. This theorem assumes that the $f_i(\alpha_i)=\alpha_i$ holds for both plans $P_e$ and $P_c$, SubOpt($P_e$, $q_c$)<GL. Similar results may be derived for other possible bounding functions, e.g. for $f_i(\alpha)=\alpha^2$, to result in the following bound: SubOpt($P_e$, $q_c$)<(GL)$^2$.

In an example R denotes that multiplicative cost factor for plan $P_e$ between $q_c$ and $q_e$, e.g., $$R = \frac{\text{Cost}(P_e, q_c)}{\text{Cost}(P_e, q_e)}.$$

R may be easily computed if $q_e$ has been optimized and $P_e$ is re-costed at $q_c$. The exact value of numerator cost in terms of R is known, (rather than upper bound in terms of G) in the sub-optimality expression for $P_e$ at $q_c$, so that the sub-optimality upper bound tightens to RL.

Figure 12:
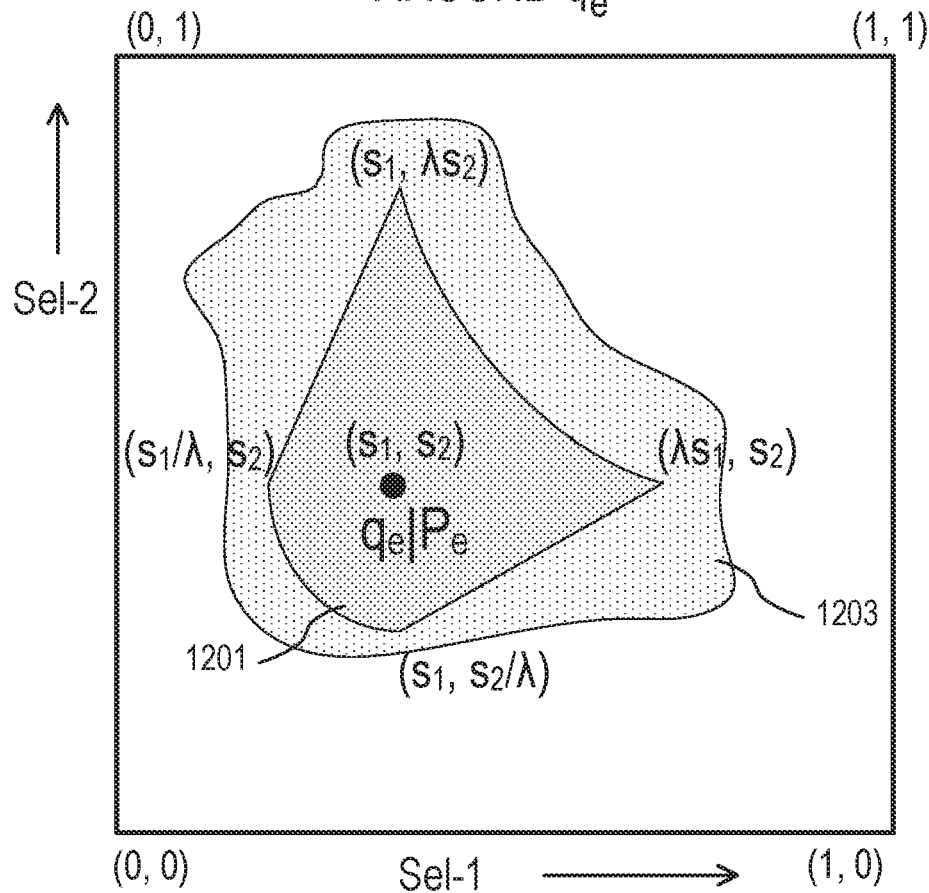
FIG. 12 is representation of the $\lambda$-optimal region around $q_e$, according to an embodiment.

A sample representation of the λ-optimal region around $q_e$ is illustrated in FIG. 12, according to an embodiment. The inner region 1101 is the selectivity based λ-optimal region that is defined by GL≤λ, as discussed above. Geometrically, the region 1201 is a closed region bounded by straight lines $$\left(y = \frac{s_2 \lambda}{s_1} x \text{ and } y = \frac{s_2}{s_1 \lambda} x,\right.$$

and hyperbolic curves $$\left(y = \frac{s_1 s_2 \lambda}{x} \text{ and } y = \frac{s_1 s_2}{\lambda x}\right).$$

The area coverage of the region may be given by:

$$\left(\lambda - \frac{1}{\lambda}\right) \cdot \ln\lambda \times s_1 s_2,$$

which is an increasing function of λ and selectivities of $q_e$, but independent of the plan choice for $q_e$. It may be noted that the area of λ-optimal region remains the same even after changes to the underlying cost model, as long as the cost growth bounding functions remain the same. e.g., $f_i(\alpha)=\alpha$.

Once the value of R is known, after using Recost for plan $P_e$ at $q_c$, then RL≤λ may be used to detect whether $q_c$ lies in the Recost region 1203, e.g., the Recost-based λ-optimal region of $P_e$. Thus, use of Recost logic helps in identifying extra opportunities of plan reuse if the cost growth is slower than that assumed by the selectivity based inference. It may be noted that, the true $\lambda$-optimal region of plan $P_e$ around a given instance $q_e$ may be even bigger and the selectivity and Recost checks may capture only a conservative portion. Also, the same plan $P_e$ may be optimal at multiple query instances.

While BCG promises to provide additional leverage compared to PCM for plan reuse with guarantees, the question of finding valid bounding functions, that is $f_1$, may be a non-trivial task. In an embodiment, $f_i(\alpha)=\alpha$, as discussed below. Bounding functions for standard physical operators in relational databases are briefly discussed, below, showing advantages of embodiments described herein.

First, the cost of a Scan operator may increase linearly with input selectivity. Therefore, if input selectivity is increased by a factor $\alpha$, then the cost may be expected to increase at most by a factor $\alpha$. Next, the cost of a Nested Loops Join operator increases as a function of $s_1 s_2$ there $s_1$ and $s_2$ represents the selectivity of the two inputs. Therefore, it may be expected that, if any one of the input's selectivity increases by a factor $\alpha$, then the cost of the operator may go up by at most a factor $\alpha$. If the selectivity increases by a factor $\alpha$ for both inputs, the cost may go up by at most a factor of $\alpha^2$. Thus, assuming $f_1(\alpha)=\alpha$ as the bounding function for each, selectivity input would suffice for these operators. Observe that for a Hash Join operator, the cost increases as a function of $s_1+s_2$ (e.g., growing slowly compared to Nested Loops Join). Hence, the above bounding function suffices for Hash Join, although the upper bound thus achieved has different degree of tightness for Nested Loops Join and Hash Join. In general, for a series of n binary-joins using the above operators, if selectivity of each input selectivity increases by a factor $\alpha$, then total cost may increase by a factor of at most $\alpha^n$. Also, may be expected that for any operator that scans each of its input only once, e.g. union, intersection, and even scalar user-defined functions, using $f_i(\alpha)=\alpha$ should be sufficient.

For operators whose implementation may require sorting of input, for example, Sort Merge Join, Sort, sorting-based Group By, the operator cost may vary as $s_1 \log s_1$ and hence its cost may increase super-linearly with input selectivity. Even for such operators, it is possible to choose a polynomial bounding function (of the form $\alpha^n$ with n>1) by using the inequality such as $$\ln x \leq \frac{x-1}{\sqrt{x}}$$

with $1 \leq x \leq \infty$. For arbitrary physical operators that fall outside the above set of standard relational operators, described embodiments may can handle such an operator if an appropriate polynomial bounding function can be defined.

Finally, it should be noted that, in practice, the cost models of modern query optimizers can be quite complex. The cost functions may be piece-wise linear, or may even contain discontinuities, e.g., the optimizer might model the transition point from a memory based sort to disk based stored due to limited memory. Also, there may be other factors that impact the plan cost, e.g., join selectivities. Despite this, the authors observed during experimentation that using $f_i(\alpha_i)=\alpha_i$ as bounding functions faces only rare violations.

If the optimization of $q_c$ results in a plan that already exists in the plan cache, the inference region for the existing plan may be modified to include $q_c$. Even if the plan is not present in the plan cache, it is possible that one of the existing plans is $\lambda$-optimal for $q_c$ as both checks in get Plan are conservative. In such a case, the new plan is considered to be redundant and may be discarded from the cache. Instead, the inference region of the existing $\lambda$-optimal plan may be modified to include $q_c$. Otherwise, the new plan $P_{opt}(q_c)$ may be added to the plan cache 575.

At any intermediate stage when the previously processed instances $W_{past}$ have been processed, $W^{opt}$ denotes the set of instances optimized to the current time. The plan cache 575 may contain a plan list and an instance list. The plan list contains a subset of plans that are optimal across $W^{opt}$ and instance list contains a 5-tuple $I=<V, PP, C, S, U>$ for each instance $q_e$ in $W^{opt}$ where
1. V denotes the selectivity vector for $q_e$;
2. PP is a pointer to plan $P(q_e)$ in plan list, which may be different from the optimal plan $P_{opt}(q_e)$;
3. C is the optimizer estimated optimal cost for $q_e$;
4. S is the sub-optimality $P(q_e)$ at $q_e$; and
5. U is the running count of the number of query instances for which the get Plan logic picks plan $P(q_e)$ through instance $q_e$.

FIG. 6 is a diagram illustrating the plan cache data structure, according to an embodiment. In an embodiment, the instance list 601 may contains one entry for each of the optimized query instances, and many instances from the instance list may point to the same stored plan in the plan list 605. In each entry in the instance list 601: V, C, S 603 may be used to capture inference region of the plan $P(q_e)$ pointed to by pointer PP 607, and hence support get Plan. Sand U may be used by manageCache logic to support the ability to reject new plans and drop existing plans from the cache, respectively.

In an embodiment, the instance list 601 may be a very small contributor to overhead, since: (a) an entry may be stored only for optimized query instances, which is usually a small fraction of all instances; and (b) the memory required for each 5-tuple (e.g., V, PP. C. S, and U) is small (~100 bytes). In comparison, the memory overheads of plan list 605 may be much larger since enough information is stored to support execution, as well as, efficient re-costing for each stored plan. In an embodiment, these overheads may be a few hundred KBs per plan. An alternative implementation of Recost may help in reducing the memory overheads, but may cause increase in its time overheads.

Figure 7:
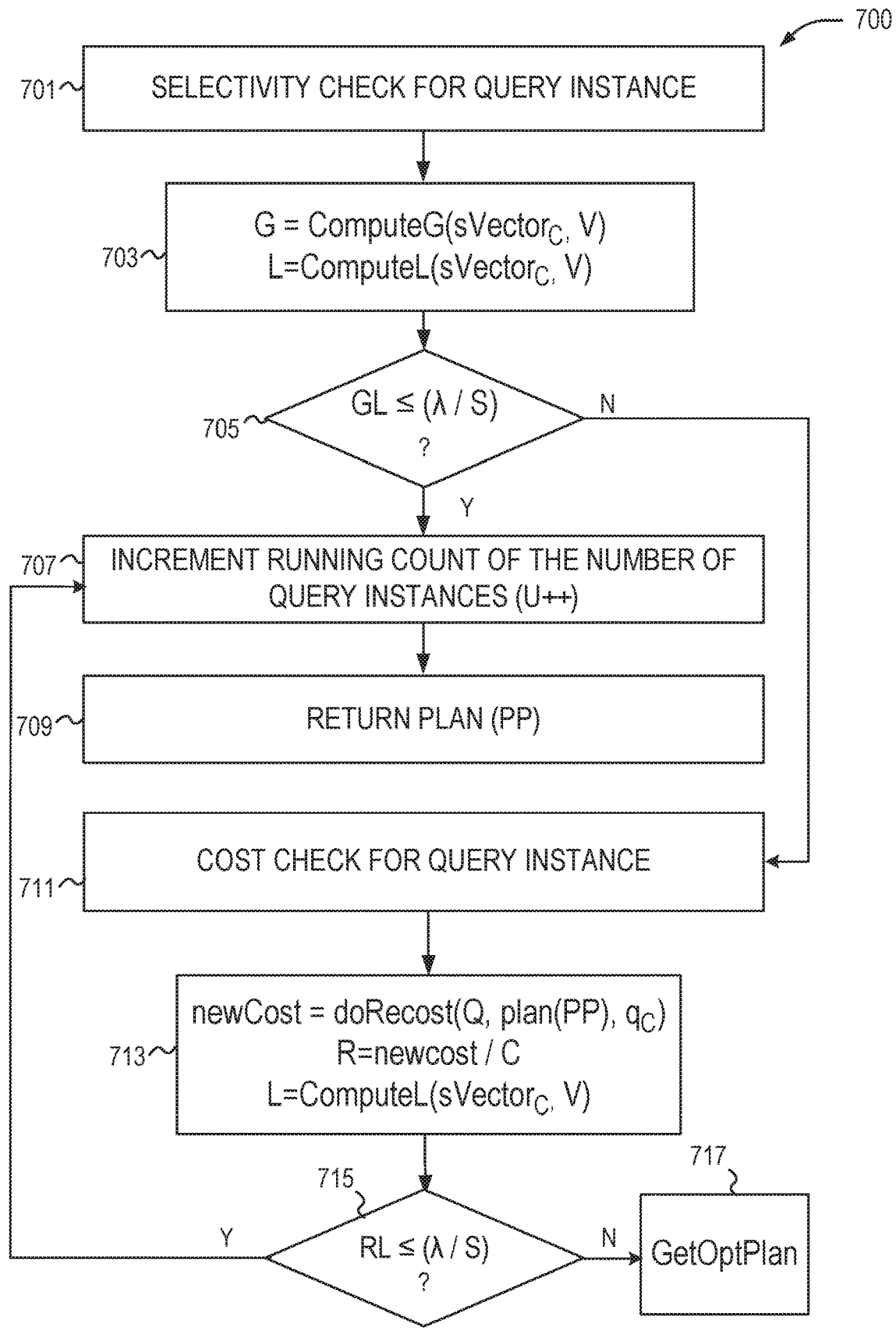
FIG. 7 is a flow diagram illustrating a method for manageCache, according to an embodiment.

Referring again to FIG. 5, the Get Plan logic 520 is described more fully, below. FIG. 7 is a flow chart illustrating a method 700 for Get Plan logic, according to an embodiment. A selectivity and cost check may be performed to determine whether one of the existing plans in the plan cache is $\lambda$-optimal for new instance $q_c$.

A selectivity check may be performed in block 701. This check determines whether query instance $q_c$ lies in the selectivity based $\lambda$-optimal region of one of the stored instance $q_e$. For any given $q_e$ from the instance list, G (cost increment factor) and L (net cost decrement factor due to selectivity ratios) may be computed using sVector$_c$ and V, as discussed above, at block 703, and then check whether $$GL \leq \frac{\lambda}{S}$$

at block 705. It should be noted that the above check allows the possibility of $P(q_e)$ to be sub-optimal with $S<\lambda$ without violating the $\lambda$-optimality guarantee of get Plan logic. If P($q_e$) is indeed the same as P$_{opt}$($q_e$), then the check simplifies to GL≤1. If the selectivity check passes (block 705), then running count of the number of query instances for which get Plan picks plan P($q_e$) through instance $q_e$ (e.g., U), may be incremented at block 707. The plan may be returned via pointer PP at block 709.

When the selectivity check fails (block 705), a cost check may be performed at block 711. This check determines whether $q_c$ lies in the re-cost based λ-optimal region around any of the stored instance $q_e$. L may be computed using sVector$_c$ and V, in block 713. The Recost ration R may be computed after computing a new cost, Cost(P($q_e$), $q_c$), and dividing the new cost by C, e.g., computing the optimal cost for $q_e$. It is determined whether the cost check is $$RL \le \frac{\lambda}{S},$$

in block 715. If the cost check fails, e.g., $q_c$ is not within the λ-optimal region for selectivity or cost, then the optimizer may be called in block 717 to return an optimized plan for query $q_c$.

Whenever a stored query instance $q_e$ succeeds the selectivity or cost check with new instance $q_c$, the counter U may be increased at block 707 to keep track of the number of query instances where the stored instance $q_e$ helped in avoiding the optimizer call. This query instance distribution metric may be leveraged by the manageCache module in determining which plans should be removed from the plan cache. After incrementing U, the plan may be returned via pointer PP at block 709.

The overheads of getPlan logic, as described, may include: (1) sVector computation; (2) traversal of instance list during selectivity and cost check; and (3) Recost calls during the cost check. During experimentation, the authors found that overheads due to Recost calls may dominate the get Plan overheads. A single invocation of Recost may require two to 10 milliseconds, depending on the number of parameters and the memory representation used for re-costing plans. This may easily exceed the overheads of sVector computation and scanning a list of few thousand instances.

The following heuristic may be used to control the number of Recost calls. Instances with large values of GL may be less likely to satisfy the cost check. To use take advantage of this, in an embodiment, the selectivity check collects potential candidates for cost-check in increasing order of their GL values and rejects all instances beyond a threshold. Storing instances with sub-optimality approximately equal to one (with cost-check), may lead to increased coverage by selectivity regions and save future Recost calls.

If the number of instances in the list goes beyond several thousand, overheads of selectivity check may become comparable to that of sVector computation. In such cases, the overheads may also be improved by exploiting similar idea of checking instances with smaller GL values first. This may be achieved by using a spatial index to provide such instances without scanning the entire list. There may be other alternative heuristics that improve average get Plan overheads by only changing the storage of instance list, such as (a) decreasing order of area of selectivity region (a function of V and λ); and (b) decreasing order of usage counts of instances (U).

Queries for different applications and database/table sizes may drive the selection of λ for selectivity and cost calculations (e.g., help determine λ-optimality regions). To decide a suitable value of λ, an Optimize-Always algorithm may selected for a small initial subset of query instances and then observe the ratio between average optimization overheads and average execution cost. For example, a query where optimization overheads are close to 50% compared to execution cost should use smaller value of λ compared to another query for which optimization overheads dominate the execution cost. The mechanism to keep track of this information may already be present in many database engines.

It may also be beneficial to use larger value of λ for cheaper instances and smaller value for expensive instances of the same query template. This is because low cost regions typically have small selectivity regions and high plan density. Embodiments may support such dynamic value of λ. Dynamic selection of λ may help in saving optimizer overheads, as well as, plan cache overheads at the expense of a relatively small increase in TotalCostRatio.

Figure 8:
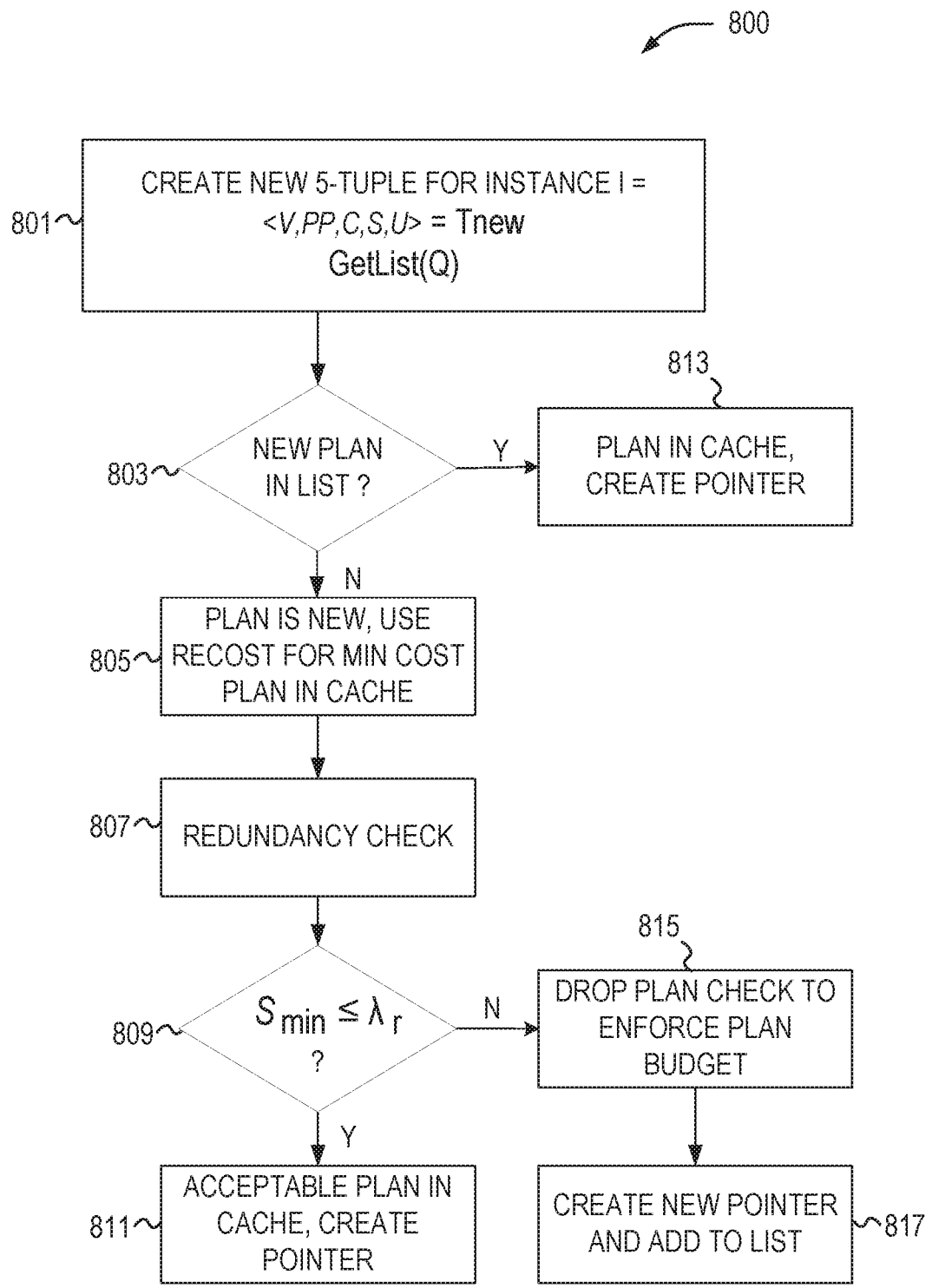
FIG. 8 is a flow diagram illustrating a method for GetPlan, according to an embodiment.

Referring again to FIG. 5, the ManageCache logic 560 is described more fully, below. FIG. 8 is a flow chart illustrating a method 800 for ManageCache logic, according to an embodiment. An optimized plan for a current query, P$_{opt}$($q_c$), may be obtained by invoking the optimizer (550). A 5-tuple of instance I=<V, PP, C, S, U>, as discussed above, may be generated in block 801, for the optimized plan. The list of all query plans Q in the plan cache may be retrieved for comparison. A determination is made as to whether the new plan is already exists with respect to existing plans in the cache, (e.g., whether the new plan is a member of the set of plans Q in the plan cache), in block 803. If the plan already exists in the plan cache, a pointer to the existing plan may be added to the plan list, and then returned in block 813.

If the optimized plan does not already exist, a search of cost acceptable existing plans may be performed in block 805. A redundancy check may iterate over all plans in the plan cache to determine the minimum cost plan P$_{min}$ and its sub-optimality S$_{min}$ for query instance $q_c$, in block 807. A determination is made as to whether S$_{min}$≤λ$_r$, where λ$_r$<λ is a configurable threshold for the redundancy check, in block 809. In an embodiment, λ$_r$=√λ. This threshold may ensure that the property of λ-optimality is maintained even while storing only a subset of encountered plans. If the plan is identified as S$_{min}$≤λ$_r$, in block 809, then it may be inferred that P$_{opt}$($q_c$) is redundant with respect to an existing plan in the plan cache. A pointer to the acceptable plan may be created and used for query $q_c$ as an optimal plan, in block 811. Otherwise, the plan may be added to the plan cache. In principle, this inclusion may also help in discarding existing plans from cache, as discussed. A check may be made to find the minimum usage plan. Instances in the list may be removed from the plan cache in block 815, when applicable. A pointer to the new plan may be added to the list in block 817.

In an embodiment, the ManageCache logic 560 may be executed asynchronously. As discussed, an embodiment may support dropping existing plans from the plan cache. This may be required in case a plan cache budget of k plans is enforced. The ManageCache logic 560 may be invoked when the addition of a new plan violates the budget constraint. However, the execution to determine plans to drop may take place concurrently, in parallel, in series, or otherwise asynchronously, because the execution is not in the critical execution path of the query execution.

In order to ensure that dropping a plan does not result in a violation of the bounded sub-optimality guarantee, while dropping plan P, all instances may be removed from the instance list that point to plan P. When manageCache logic may be required to drop a plan, it may drop the plan with minimum aggregate usage count, e.g., sum over U values, across its instances. This heuristic choice is equivalent to least frequently used (LFU) policy and is expected to perform well in the cases when future workload has the same query instance distribution as $W_{past}$.

Referring again to FIG. 5, the required features of sVector computation 510 and Recost 530 may be implemented by reusing modules that are already present inside a query optimizer 550, e.g., predicate selectivity computation module, and plan cost computation module, respectively. Overheads for selectivity computation 521 and cost computation 523 are expected to be much lower than an optimizer call. In an embodiment, many fewer invocations of these modules 521, 523 may be required compared to a regular optimizer call 550.

In an embodiment, Recost 530 may be implemented with an API call. Features of the API for a Microsoft SQL Server database engine which follows Cascades framework, for instance, are discussed below. It should be understood that the described features may be applied to any engine whose query optimizer is based on memoization.

In an embodiment, the query optimizer 550 computes the selectivities of all parameterized base predicates right after parsing stage, e.g., during the phase where logical properties of memo groups are determined. Hence, an API for sVector computation 510 may be efficiently implemented by short-circuiting the physical transformation phase altogether. In an embodiment, a Recost plan $P_e$ for query instance $q_c$ may be calculated, where $P_e$ is found after optimization of $q_e$. A cacheable representation for plan $P_e$ may be computed at the end of optimization phase of query instance $q_e$. This representation may then be stored along with actual execution plan $P_e$ in the plan cache 575 and used to for future Recost calls 530.

At the end of optimization phase, the optimizer choice plan may be extracted out of a Memo data structure. In an example SQL database, Memo is a data structure used by the query optimizer component of the SQL Server, and may be used for larger amounts of text. In an example query optimizer, Memo is a search data structure that may be used to store the alternatives generated and analyzed by the SQL Server query optimizer. These alternatives can be logical or physical operators and may be organized into groups such that each alternative in the same group produces the same results. At this stage, the size of Memo may be quite large as it may contain many groups and expressions that were considered during plan search but are no longer required for the final optimizer choice plan $P_e$. These extra groups and expressions may be pruned to result in a shrunkenMemo data structure. Such pruning may reduce the size of shrunkenMemo by around 70% or more for complex queries that access large number of relations. This shrunkenMemo data structure may be stored in the plan cache 575. When Recost API 530 is invoked with a pointer to shrunkenMemo, the cost for $q_c$ may be computed by replacing the new parameters in the base groups of shrunkenMemo, followed by cardinality and cost re-derivation in a bottom-up fashion that typically consists of arithmetic computations.

The overheads of this re-derivation process may depend on the number of groups in the shrunkenMemo and large savings may result by executing the Memo pruning step. It should be noted that, the overhead to create shrunkenMemo may be only one time per plan, and thus are not necessary to be included in the overhead calculation of Recost API 530. There may be alternative implementations of Recost that require lesser memory overheads at the cost of increased time overheads for each Recost call.

Existing techniques do not support redundancy check as described herein. However, in an embodiment, an existing optimization system may use the Recost feature to implement a redundancy check similar to that described above. This modification of existing systems may include improving numPlans, e.g., the number of plans cached. Integrating the Recost feature into existing techniques may also improve optimizer overheads for some of the existing techniques. This is because such modification allows the optimizing systems to make larger selectivity inference regions for each plan because there would now be more instances with the same plan choice. However, with regard to cost sub-optimality metrics, the MSO and TotalCostRatio values may either remain in the same high range or even degrade further as shown using Recost based redundancy checks, without also using the selectivity and cost functions, as described above. In contrast, use of Recost feature brings advantage in overheads without violating the sub-optimality constraint.

Figure 13:
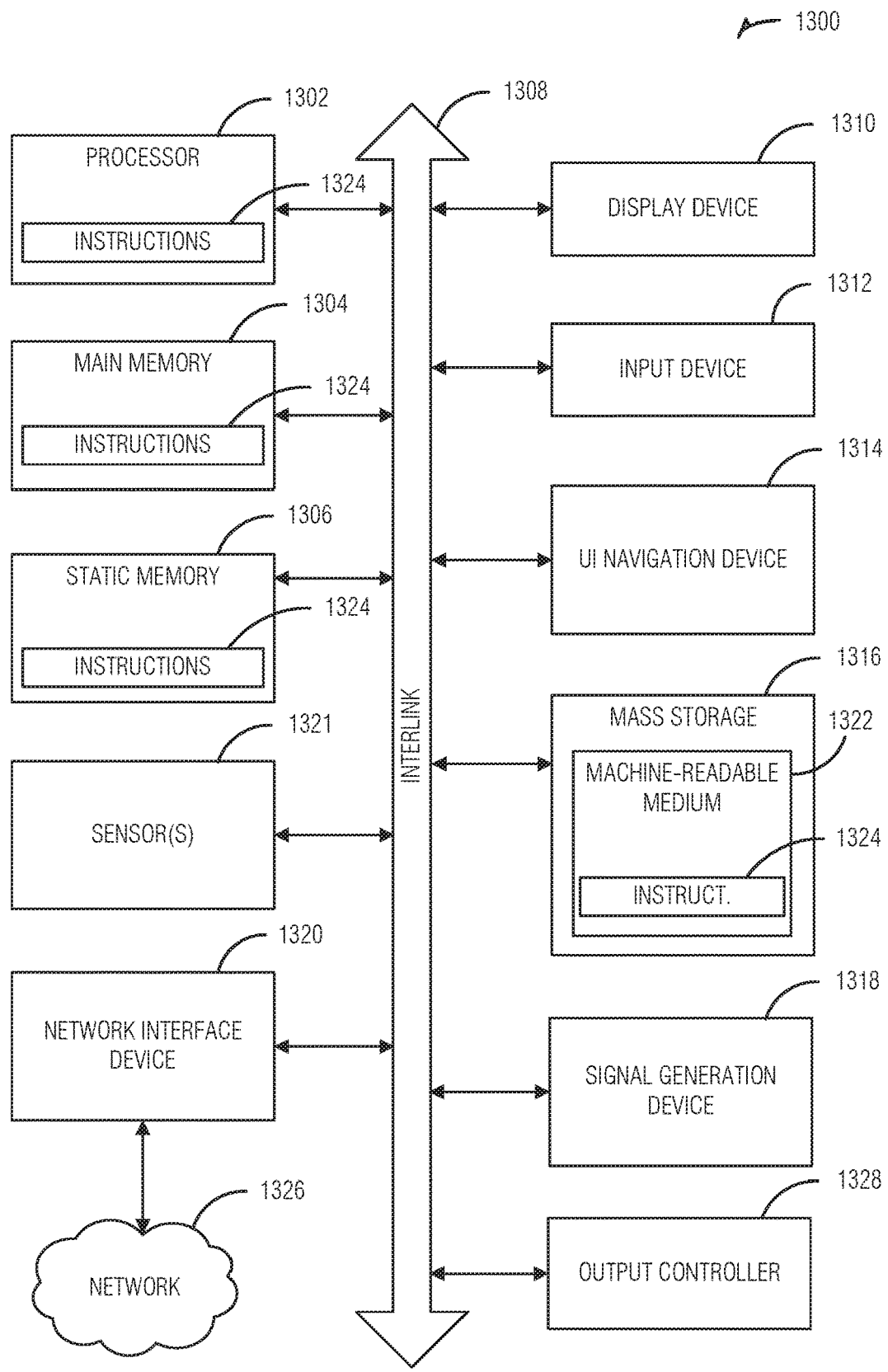
FIG. 13 is a block diagram illustrating an example of a machine upon which one or more embodiments may be implemented.

FIG. 13 illustrates a block diagram of an example machine 1300 upon which any one or more of the techniques (e.g., methodologies) discussed herein may perform. In alternative embodiments, the machine 1300 may operate as a standalone device or may be connected (e.g., networked) to other machines. In a networked deployment, the machine 1300 may operate in the capacity of a server machine, a client machine, or both in server-client network environments. In an example, the machine 1300 may act as a peer machine in peer-to-peer (P2P) (or other distributed) network environment. The machine 1300 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic or a number of components, or mechanisms. Circuitry is a collection of circuits implemented in tangible entities that include hardware (e.g., simple circuits, gates, logic, etc.). Circuitry membership may be flexible over time and underlying hardware variability. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

Machine (e.g., computer system) 1300 may include a hardware processor 1302 (e.g., a central processing unit (CPU), a graphics processing unit (GPU), a hardware processor core, or any combination thereof), a main memory 1304 and a static memory 1306, some or all of which may communicate with each other via an interlink (e.g., bus) 1308. The machine 1300 may further include a display unit 1310, an alphanumeric input device 1312 (e.g., a keyboard), and a user interface (UI) navigation device 1314 (e.g., a mouse). In an example, the display unit 1310, input device 1312 and UI navigation device 1314 may be a touch screen display. The machine 1300 may additionally include a storage device (e.g., drive unit) 1316, a signal generation device 1318 (e.g., a speaker), a network interface device 1320, and one or more sensors 1321, such as a global positioning system (GPS) sensor, compass, accelerometer, or other sensor. The machine 1300 may include an output controller 1328, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 1316 may include a machine readable medium 1322 on which is stored one or more sets of data structures or instructions 1324 (e.g., software) embodying or utilized by any one or more of the techniques or functions described herein. The instructions 1324 may also reside, completely or at least partially, within the main memory 1304, within static memory 1306, or within the hardware processor 1302 during execution thereof by the machine 1300. In an example, one or any combination of the hardware processor 1302, the main memory 1304, the static memory 1306, or the storage device 1316 may constitute machine readable media.

While the machine readable medium 1322 is illustrated as a single medium, the term "machine readable medium" may include a single medium or multiple media (e.g., a centralized or distributed database, and/or associated caches and servers) configured to store the one or more instructions 1324.

The term "machine readable medium" may include any medium that is capable of storing, encoding, or carrying instructions for execution by the machine 1300 and that cause the machine 1300 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks, and CD-ROM and DVD-ROM disks.

The instructions 1324 may further be transmitted or received over a communications network 1326 using a transmission medium via the network interface device 1320 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1320 may include one or more physical jacks (e.g., Ethernet, coaxial, or phone jacks) or one or more antennas to connect to the communications network 1326. In an example, the network interface device 1320 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1300), and includes digital or analog communications signals or other intangible medium to facilitate communication of such software.

Additional Notes and Examples

Examples may include subject matter such as a method, means for performing acts of the method, at least one machine-readable medium including instructions that, when performed by a machine cause the machine to performs acts of the method, or of an apparatus or system for selecting optimized query plans for a database engine according to embodiments and examples described herein.

Example 1 is a system comprising: a server having a database engine coupled to a processor to service database queries; a plan cache storing a plurality of query plans; and at least one computer readable storage medium having instructions stored thereon, the instructions when executed by the processor cause the processor to execute: optimizer logic coupled to the database engine, the optimizer logic configured to receive a selectivity vector and return an optimized query plan for query instance $q_c$, when the query instance $q_c$ is not in an acceptable near-optimality region for any of the plans stored in the plan cache; and get-plan logic coupled to the database engine configured to identify a plan for query execution of query instance $q_c$, wherein the get-plan logic comprises determining logic configured to determine whether the query instance $q_c$, falls into the acceptable near-optimal region for cached query plans, the determining logic configured to perform a selectivity check and cost check for the query instance $q_c$, the determining logic configured to perform the selectivity check first, and if the selectivity check fails, then perform the cost check for the query instance $q_c$, and if both the selectivity check and cost check fail, then request an optimized plan from the optimizer logic, and when either of the selectivity check or cost check succeeds, then they provide a plan for query instance $q_c$, from the plan cache.

In Example 2, the subject matter of Example 1 optionally includes wherein the selectivity check further comprises logic to: determine whether query instance $q_c$ lies in a selectivity based λ-optimal region of a stored instance $q_e$ in the plan cache, wherein the selectivity region for $q_e$ is determined using a product of a cost increment factor G and net cost decrement factor due to selectivity ratios L, where the product GL is less than or equal to a threshold based on a ratio of a pre-determined value of λ and sub-optimality of plan stored for $q_e$.

In Example 3, the subject matter of Example 2 optionally includes wherein the determining logic is configured to perform the cost check only when the selectivity check fails.

In Example 4, the subject matter of any one or more of Examples 2-3 optionally include cost check logic, configured to compute a cost of using an optimal plan associated with an already optimized query instance $q_a$, for a new query instance $q_b$, and determine whether the optimal plan for $q_a$ can be used for $q_b$ while maintaining a bound on plan cost sub-optimality.

In Example 5, the subject matter of Example 4 optionally includes wherein the selectivity check is configured to collect potential plan candidates for cost-check in increasing order of a GL product value, wherein L is a net cost decrement factor due to selectivity, and G is a net cost increment factor between $q_a$ and $q_b$, and wherein the selectivity check is configured to reject all instances beyond a threshold.

In Example 6, the subject matter of Example 5 optionally includes wherein a spatial index is used to provide instances with increasing GL value, and wherein query instances with lower GL value are processed first by the cost check without having to scan the entire list of instances.

In Example 7, the subject matter of any one or more of Examples 1-6 optionally include cache management logic configured to manage the plan cache, wherein the cache management logic is configured to identify whether the same, or redundant, plan already exists in the plan cache before storing a new optimized plan for query instance $q_c$, and when the same plan already exists, adjust an inference region for the existing plan to include query instance $q_c$.

In Example 8, the subject matter of Example 7 optionally includes wherein identifying whether a newly optimized plan is redundant for the plan cache includes instructions to iterate over all plans in the plan cache to determine a minimum cost plan Pmin and a sub-optimality Smin value for the query instance $q_c$, wherein when Smin is below a configurable threshold, then the new optimized plan is identified as redundant with respect to an existing plan in the plan cache.

In Example 9, the subject matter of any one or more of Examples 7-8 optionally include wherein the cache management logic is further configured to selectively prune a plan from the plan cache based on criteria including age, usage frequency or redundancy of the plan.

In Example 10, the subject matter of Example 9 optionally includes wherein the cache management logic is further configured to continue selective pruning of plans from the plan cache to maintain the plan cache at less than or equal to a pre-determined threshold k for number of plans stored.

In Example 11, the subject matter of any one or more of Examples 7-10 optionally include wherein the cache management logic is configured to operate asynchronously to decide about the plan provided for query instance qc.

Example 12 is a computer implemented method, comprising: receiving a selectivity vector for a first query instance; and identifying an optimized query plan for the first query instance, wherein identifying the optimized query plan includes: determining whether the first query instance, falls into an acceptable near-optimality region for a cached query plan, performing a selectivity check and a cost check for the first query instance, performing the selectivity check first, and if the selectivity check fails, then performing the cost check for the first query instance, and if both the selectivity check and cost check fail, requesting an optimized plan from optimizer logic, and when either of the selectivity check or cost check succeeds, providing a plan for the first query instance, from the plan cache.

In Example 13, the subject matter of Example 12 optionally includes wherein the selectivity check further comprises: determining whether first query instance lies in a selectivity based λ-optimal region of a second query instance stored in the plan cache, wherein the selectivity region for the second query instance is determined using a product of a cost increment factor G and net cost decrement factor due to selectivity ratios L, where the product GL is less than or equal to a threshold based on a ratio of a pre-determined value of λ and sub-optimality of plan stored for the second query instance.

In Example 14, the subject matter of Example 13 optionally includes wherein the determining further comprises: performing the cost check only when the selectivity check fails.

In Example 15, the subject matter of any one or more of Examples 13-14 optionally include computing a cost of using an optimal plan associated with the second query instance, for the first query instance; and determining whether the optimal plan for the second query instance can be used for the first query instance while maintaining a bound on plan cost sub-optimality.

In Example 16, the subject matter of Example 15 optionally includes wherein the selectivity check further comprises: collecting potential plan candidates for cost-check in increasing order of a GL product value, wherein L is a net cost decrement factor due to selectivity, and G is a net cost increment factor between the first query instance and another query instance, and wherein the selectivity check rejects all instances beyond a threshold.

In Example 17, the subject matter of Example 16 optionally includes wherein a spatial index is used to provide instances with increasing GL value, and wherein query instances with lower GL value are processed first by the cost check without having to scan the entire list of instances.

In Example 18, the subject matter of any one or more of Examples 12-17 optionally include managing the plan cache, including identifying whether the same, or redundant, plan already exists in the plan cache before storing a new optimized plan for the first query instance, and when the same plan already exists, adjusting an inference region for the existing plan to include the first query instance.

In Example 19, the subject matter of Example 18 optionally includes wherein identifying whether a newly optimized plan is redundant for the plan cache comprises: iterating over all plans in the plan cache to determine a minimum cost plan Pmin and a sub-optimality Smin value for the first query instance, wherein when Smin is below a configurable threshold, then identifying the new optimized plan as redundant with respect to an existing plan in the plan cache.

In Example 20, the subject matter of any one or more of Examples 18-19 optionally include selectively pruning a plan from the plan cache based on criteria including age, usage frequency or redundancy of the plan.

In Example 21, the subject matter of Example 20 optionally includes wherein the cache management logic is further configured to continue selective pruning of plans from the plan cache to maintain the plan cache at less than or equal to a pre-determined threshold k for number of plans stored.

In Example 22, the subject matter of any one or more of Examples 18-21 optionally include wherein the managing the plan cache is configured to operate asynchronously with query plan execution.

Example 23 is a computer implemented method for query plan cache management, comprising: managing a query plan cache of a database query engine system, wherein managing the query plan cache includes: identifying whether the same plan exists in the plan cache before storing a new optimized plan for query instance qc; and when the same plan exists, adjusting an inference region for the existing plan to include query instance qc, wherein managing the query plan cache operates asynchronously to decide about the plan provided for query instance qc.

In Example 24, the subject matter of Example 23 optionally includes wherein identifying whether a newly optimized plan is redundant for the plan cache includes: iterating over all plans in the plan cache to determine a minimum cost plan Pmin and a sub-optimality Smin value for the query instance qc, wherein when Smin is below a configurable threshold, then the new optimized plan is redundant with respect to an existing plan in the plan cache.

In Example 25, the subject matter of any one or more of Examples 23-24 optionally include selectively pruning a plan from the plan cache based on criteria including age, usage frequency or redundancy of the plan.

In Example 26, the subject matter of Example 25 optionally includes continuing selective pruning of plans from the plan cache to maintain the plan cache at less than or equal to a pre-determined threshold k for number of plans stored.

Example 27 is a system comprising means to perform operations of any of Examples 12-26.

Example 28 is a computer readable storage medium having instructions stored thereon, the instructions when executed by a processor cause a machine to perform the operations of any of Examples 12-26.

Example 29 is a computer readable storage medium having instructions stored thereon, the instructions when executed by a processor cause a machine to receive a request for recost information; and execute a recost application program interface (API), the recost API including instructions to: (a) identify an optimized query plan associated with a first query instance, the optimized query plan stored in a plan cache; (b) send a request to an optimizer for cost information associated with the optimized query plan for use with a second query instance: (c) receive the cost information from the optimizer; (d) provide the cost information associated with the second query instance; (e) iterate instructions (a) through (d) for at least one additional optimized query plan in the plan cache; and (f) select a best query plan for the second query instance, the best query plan selected from one of the optimized query plan and the at least one additional query plan, the selecting based at least on the cost information associated with the second query instance.

In Example 30, the subject matter of Example 29 optionally includes instructions to: prune a first plan from the plan cache when the cost information for the first plan is within a pre-determined threshold compared to cost information for a second plan already stored in the plan cache, wherein the pruning of the first plan includes one of removing the first plan from the plan cache or declining to store the first plan in the plan cache when the first plan is not already stored in the plan cache.

In Example 31, the subject matter of Example 30 optionally includes instructions to: perform a redundancy check using the cost information provided, wherein the redundancy check enables a widened selectivity inference region for the optimized query plan; and store information associated with the widened selectivity inference region in a plan cache storage.

In Example 32, the subject matter of any one or more of Examples 29-31 optionally include wherein the recost API logic is configured to be used with a legacy parametric query optimization database engine.

In Example 33, the subject matter of any one or more of Examples 29-32 optionally include instructions to: perform a selectivity check for the second query instance; and when the selectivity check fails, then initiate a cost check using the recost API.

Example 34 is a system comprising: a server having a database engine coupled to a processor to service database queries; a plan cache storing a plurality of query plans; and at least one computer readable storage medium as recited in any of Examples 29-33.

The techniques described herein are not limited to any particular hardware or software configuration; they may find applicability in any computing, consumer electronics, or processing environment. The techniques may be implemented in hardware, software, firmware or a combination, resulting in logic or circuitry which supports execution or performance of embodiments described herein.

For simulations, program code may represent hardware using a hardware description language or another functional description language which essentially provides a model of how designed hardware is expected to perform. Program code may be assembly or machine language, or data that may be compiled and/or interpreted. Furthermore, it is common in the art to speak of software, in one form or another as taking an action or causing a result. Such expressions are merely a shorthand way of stating execution of program code by a processing system which causes a processor to perform an action or produce a result.

Each program may be implemented in a high level procedural, declarative, and/or object-oriented programming language to communicate with a processing system. However, programs may be implemented in assembly or machine language, if desired. In any case, the language may be compiled or interpreted.

Program instructions may be used to cause a general-purpose or special-purpose processing system that is programmed with the instructions to perform the operations described herein. Alternatively, the operations may be performed by specific hardware components that contain hardwired logic for performing the operations, or by any combination of programmed computer components and custom hardware components. The methods described herein may be provided as a computer program product, also described as a computer or machine accessible or readable medium that may include one or more machine accessible storage media having stored thereon instructions that may be used to program a processing system or other electronic device to perform the methods.

Program code, or instructions, may be stored in, for example, volatile and/or non-volatile memory, such as storage devices and/or an associated machine readable or machine accessible medium including solid-state memory, hard-drives, floppy-disks, optical storage, tapes, flash memory, memory sticks, digital video disks, digital versatile discs (DVDs), etc., as well as more exotic mediums such as machine-accessible biological state preserving storage. A machine readable medium may include any mechanism for storing, transmitting, or receiving information in a form readable by a machine, and the medium may include a tangible medium through which electrical, optical, acoustical or other form of propagated signals or carrier wave encoding the program code may pass, such as antennas, optical fibers, communications interfaces, etc. Program code may be transmitted in the form of packets, serial data, parallel data, propagated signals, etc., and may be used in a compressed or encrypted format.

Program code may be implemented in programs executing on programmable machines such as mobile or stationary computers, personal digital assistants, smart phones, mobile Internet devices, set top boxes, cellular telephones and pagers, consumer electronics devices (including DVD players, personal video recorders, personal video players, satellite receivers, stereo receivers, cable TV receivers), and other electronic devices, each including a processor, volatile and/or non-volatile memory readable by the processor, at least one input device and/or one or more output devices. Program code may be applied to the data entered using the input device to perform the described embodiments and to generate output information. The output information may be applied to one or more output devices. One of ordinary skill in the art may appreciate that embodiments of the disclosed subject matter can be practiced with various computer system configurations, including multiprocessor or multiple-core processor systems, minicomputers, mainframe computers, as well as pervasive or miniature computers or processors that may be embedded into virtually any device. Embodiments of the disclosed subject matter can also be practiced in distributed computing environments, cloud environments, peer-to-peer or networked microservices, where tasks or portions thereof may be performed by remote processing devices that are linked through a communications network.

A processor subsystem may be used to execute the instruction on the machine-readable or machine accessible media. The processor subsystem may include one or more processors, each with one or more cores. Additionally, the processor subsystem may be disposed on one or more physical devices. The processor subsystem may include one or more specialized processors, such as a graphics processing unit (GPU), a digital signal processor (DSP), a field programmable gate array (FPGA), or a fixed function processor.

Although operations may be described as a sequential process, some of the operations may in fact be performed in parallel, concurrently, and/or in a distributed environment, and with program code stored locally and/or remotely for access by single or multi-processor machines. In addition, in some embodiments the order of operations may be rearranged without departing from the spirit of the disclosed subject matter. Program code may be used by or in conjunction with embedded controllers.

Examples, as described herein, may include, or may operate on, circuitry, logic or a number of components, modules, or mechanisms. Modules may be hardware, software, or firmware communicatively coupled to one or more processors in order to carry out the operations described herein. It will be understood that the modules or logic may be implemented in a hardware component or device, software or firmware running on one or more processors, or a combination. The modules may be distinct and independent components integrated by sharing or passing data, or the modules may be subcomponents of a single module, or be split among several modules. The components may be processes running on, or implemented on, a single compute node or distributed among a plurality of compute nodes running in parallel, concurrently, sequentially or a combination, as described more fully in conjunction with the flow diagrams in the figures. As such, modules may be hardware modules, and as such modules may be considered tangible entities capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations. Accordingly, the term hardware module is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured, arranged or adapted by using software; the general-purpose hardware processor may be configured as respective different modules at different times. Software may accordingly configure a hardware processor, for example, to constitute a particular module at one instance of time and to constitute a different module at a different instance of time. Modules may also be software or firmware modules, which operate to perform the methodologies described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to suggest a numerical order for their objects.

While this subject matter has been described with reference to illustrative embodiments, this description is not intended to be construed in a limiting or restrictive sense. For example, the above-described examples (or one or more aspects thereof) may be used in combination with others. Other embodiments may be used, such as will be understood by one of ordinary skill in the art upon reviewing the disclosure herein. The Abstract is to allow the reader to quickly discover the nature of the technical disclosure. However, the Abstract is submitted with the understanding that it will not be used to interpret or limit the scope or meaning of the claims.

What is claimed is:

1. A system comprising:
 a server having a database engine coupled to a processor to service database queries;
 a plan cache storing a plurality of query plans; and
 at least one non-transitory computer readable storage medium having instructions stored thereon, the instructions when executed by the processor cause the processor to execute:
 optimizer logic coupled to the database engine, the optimizer logic configured to receive a selectivity vector and return an optimized query plan for query instance $q_c$, when the query instance $q_c$ is not in an acceptable near-optimality region for any of the plans stored in the plan cache; and
 get-plan logic coupled to the database engine configured to identify a plan for query execution of query instance $q_c$,
 wherein the get-plan logic comprises determining logic configured to determine whether the query instance $q_c$, falls into the acceptable near-optimal region for cached query plans,
 the determining logic configured to perform a selectivity check and cost check for the query instance $q_c$,
 the determining logic configured to perform the selectivity check first, and if the selectivity check fails, then perform the cost check for the query instance $q_c$, and if both the selectivity check and cost check fail, then request an optimized plan from the optimizer logic, and when either of the selectivity check or cost check succeeds, then they provide a plan for query instance $q_c$, from the plan cache; and
 cache management logic configured to manage the plan cache, wherein the cache management logic is configured to identify whether the same plan already exists in the plan cache before storing a new optimized plan for query instance $q_c$, and when the same plan already exists, adjust the inference region for the existing plan to include query instance $q_c$.

2. The system as recited in claim 1, wherein the selectivity check further comprises logic to:
 determine whether query instance $q_c$ lies in a selectivity based λ-optimal region of a stored instance $q_e$ in the plan cache, wherein the selectivity region for $q_e$ is determined using a product of a cost increment factor G and net cost decrement factor due to selectivity ratios L, where the product GL is less than or equal to a threshold based on a ratio of a pre-determined value of λ and sub-optimality of plan stored for $q_e$.

3. The system as recited in claim 2, wherein the determining logic is configured to perform the cost check only when the selectivity check fails.

4. The system as recited in claim 2, further comprising:
 cost check logic, configured to compute a cost of using an optimal plan associated with an already optimized query instance $q_a$, for a new query instance $q_b$, and determine whether the optimal plan for $q_a$ can be used for $q_b$ while maintaining a bound on plan cost sub-optimality.

5. The system as recited in claim 4, wherein thy: selectivity check is configured to collect potential plan candidates for cost-check in increasing order of a GL product value, wherein L is a net cost decrement factor due to selectivity, and G is a net cost increment factor between $q_a$ and $q_b$, and wherein the selectivity check is configured to reject all instances beyond a threshold.

6. The system as recited in claim 5, wherein a spatial index is used to provide instances with increasing GL value, and wherein query instances with lower GL value are processed first by the cost check without having to scan the entire list of instances.

7. The system as recited in claim 1, wherein identifying whether a newly optimized plan is redundant for the plan cache includes instructions to iterate over all plans in the plan cache to determine a minimum cost plan $P_{min}$ and a sub-optimality $S_{min}$ value for the query instance $q_c$, wherein when $S_{min}$ is below a configurable threshold, then the new optimized plan is redundant with respect to an existing plan in the plan cache.

8. The system as recited in claim 1, wherein the cache management logic is further configured to selectively prune a plan from the plan cache based on criteria including age, usage frequency or redundancy of the plan.

9. The system as recited in claim 8, wherein the cache management logic is further configured to continue selective pruning of plans from the plan cache to maintain the plan cache at less than or equal to a pre-determined threshold k for number of plans stored.

10. The system as recited in claim 1, wherein the cache management logic is configured to operate asynchronously to decide about the plan provided for query instance $q_c$.

11. A system comprising:
 a server having a database engine coupled to a processor to service database queries;
 a plan cache storing a plurality of query plans; and
 at least one non-transitory computer readable storage medium having instructions stored thereon, the instructions when executed by the processor cause the processor to execute:
 optimizer logic coupled to the database engine, the optimizer logic configured to receive a selectivity vector and return an optimized query plan for query instance $q_c$, when the query instance $q_c$ is not in an acceptable near-optimality region for any of the plans stored in the plan cache; and
 get-plan logic coupled to the database engine configured to identify a plan for query execution of query instance $q_c$,
 determine whether the query instance $q_c$ lies in a selectivity based λ-optimal region of a stored instance $q_e$ in the plan cache, wherein the selectivity region for $q_e$ is determined using a product of a cost increment factor G and net cost decrement factor due to selectivity ratios L, where the product GL is less than or equal to a threshold based on a ratio of a pre-determined value of λ and sub-optimality of plan stored for $q_e$,
 wherein the get-plan logic comprises determining logic configured to determine whether the query instance $q_c$, falls into the acceptable near-optimal region for cached query plans,
 the determining logic configured to perform a selectivity check and cost check for the query instance $q_c$,
 the determining logic configured to perform the selectivity check first, and if the selectivity check fails, then perform the cost check for the query instance $q_c$, and if both the selectivity check and cost check fail, then request an optimized plan from the optimizer logic, and when either of the selectivity check or cost check succeeds, then they provide a plan for query instance $q_c$, from the plan cache.

12. The system as recited in claim 11, wherein the determining logic is configured to perform the cost check only when the selectivity check fails.

13. The system as recited in claim 12, further comprising:
cost check logic, configured to compute a cost of using an optimal plan associated with an already optimized query instance $q_a$, for a new query instance $q_b$, and determine whether the optimal plan for $q_a$ can be used for $q_b$ while maintaining a bound on plan cost sub-optimality.

14. The system as recited in claim 13, wherein the selectivity check is configured to collect potential plan candidates for cost-check in increasing order of a GL product value, wherein L is a net cost decrement factor due to selectivity, and G is a net cost increment factor between $q_a$ and $q_b$, and wherein the selectivity check is configured to reject all instances beyond a threshold.

15. The system as recited in claim 14, wherein a spatial index is used to provide instances with increasing GL value, and wherein query instances with lower GL value are processed first by the cost check without having to scan the entire list of instances.

16. A computer-implemented method for query plan cache management, the method comprising:
receiving, by optimizer logic coupled to a database engine, a selectivity vector and return an optimized query plan for query instance $q_c$, when the query instance $q_c$ is not in an acceptable near-optimality region for any query plans stored in a plan cache; and
identifying, by get-plan logic coupled to the database engine, a plan for query execution of the query instance $q_c$;
determining, by the get-plan logic, whether the query instance $q_c$, falls into the acceptable near-optimal region for cached query plans;
performing, by the get-plan logic, a selectivity check and cost check for the query instance $q_c$;
performing, by the get-plan logic, the selectivity check first, and if the selectivity check fails, then perform the cost check for the query instance $q_c$, and if both the selectivity check and cost check fail, then request an optimized plan from the optimizer logic, and when either of the selectivity check or cost check succeeds, then provide a plan for the query instance $q_c$, from the plan cache; and
managing, by cache management logic, the plan cache, including identifying whether the same plan already exists in the plan cache before storing a new optimized plan for query instance $q_c$, and when the same plan already exists, adjust the inference region for the existing plan to include the query instance $q_c$.

17. The method as recited in claim 16, wherein identifying whether a newly optimized plan is redundant for the plan cache includes iterating over all plans in the plan cache to determine a minimum cost plan $P_{min}$ and a sub-optimality $S_{min}$ value for the query instance $q_c$, wherein when $S_{min}$ is below a configurable threshold, then the new optimized plan is redundant with respect to an existing plan in the plan cache.

18. The method as recited in claim 16, further comprising selectively pruning a plan from the plan cache based on criteria including age, usage frequency or redundancy of the plan.

19. The method as recited in claim 18, further comprising continuing selective pruning of plans from the plan cache to maintain the plan cache at less than or equal to a predetermined threshold k for number of plans stored.

20. The method as recited in claim 16, further comprising operating asynchronously to decide about the plan provided for the query instance $q_c$.

* * * * *